US007777177B2

(12) United States Patent
Klotzer

(10) Patent No.: US 7,777,177 B2
(45) Date of Patent: Aug. 17, 2010

(54) SYSTEM FOR RESPONDING TO A SUPERPOSITION OF QUANTUM STATES

(76) Inventor: Daniel S. Klotzer, 426A Lake Ave., St. Louis, MO (US) 63108

( * ) Notice: Subject to any disclaimer, the term of this patent is extended or adjusted under 35 U.S.C. 154(b) by 0 days.

(21) Appl. No.: 10/757,615

(22) Filed: Jan. 13, 2004

(65) Prior Publication Data

US 2004/0206888 A1    Oct. 21, 2004

Related U.S. Application Data

(60) Provisional application No. 60/439,712, filed on Jan. 13, 2003.

(51) Int. Cl.
*G01J 4/00* (2006.01)
(52) U.S. Cl. ............... 250/227.19; 250/227.27
(58) Field of Classification Search ............ 250/227.19, 250/227.27, 226, 227.21, 216; 356/450–452, 356/456; 359/245–252
See application file for complete search history.

(56) References Cited

U.S. PATENT DOCUMENTS 6,462,877 B1 * 10/2002 Hait ........................... 359/583

| | | | |
|---|---|---|---|
| 6,483,592 B2 | 11/2002 | Pedigo | |
| 6,522,749 B2 | 2/2003 | Wang | |
| 6,633,053 B1 | 10/2003 | Jaeger | |
| 6,646,727 B2 | 11/2003 | Saleh et al. | |
| 6,801,626 B1 * | 10/2004 | Nambu | ........................ 380/256 |
| 6,909,497 B2 * | 6/2005 | Holbrook | .................... 356/73.1 |

OTHER PUBLICATIONS

Daniel S. Klotzer, "The Episodic Time Interpretation of Reality", arxive.org Web publication, Mar. 31, 2005, 69 pages, url = http://arxiv.org/ftp/quant-ph/papers/0503/0503242.pdf.

* cited by examiner

*Primary Examiner*—Que T Le
(74) *Attorney, Agent, or Firm*—Klozter Patents; Dan Klotzer

(57) ABSTRACT

A system including methods and apparatuses for responding to an entity's superposition of states. The system is also able to respond to a first entity's state of entanglement, as well as respond to either the superposition of states or entanglement of any other entity that is entangled with the first entity. The system is capable of effecting its responses to superpositions of states or entanglements in modes that can preserve or demolish the superposition of states or entanglements of the entities it interacts with. The system is able to selectively switch between these modes of responses, and can also effect its responses in a delayed-choice manner. The system also encompasses applications of the methods and apparatuses for purposes including quantum communication, quantum computation, and quantum cryptography.

108 Claims, 3 Drawing Sheets

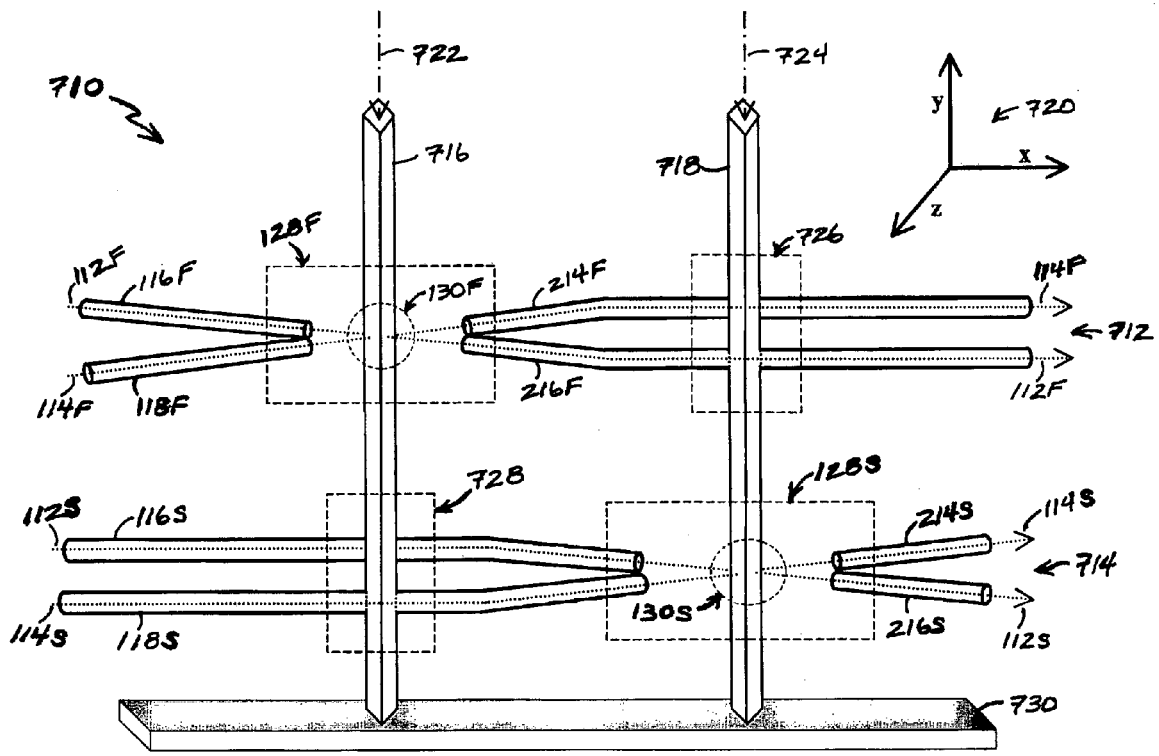
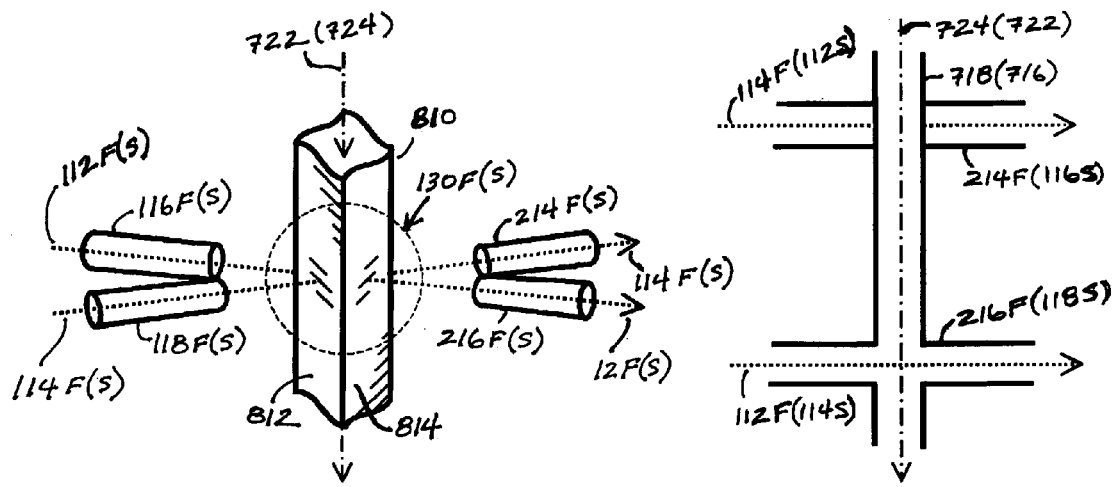
Fig. 7
Fig. 8
Fig. 9

SYSTEM FOR RESPONDING TO A SUPERPOSITION OF QUANTUM STATES

CROSS-REFERENCE TO RELATED APPLICATIONS

This non-provisional application claims the benefit of U.S. Provisional Patent Application Ser. No. 60/439,712, filed on Jan. 13, 2003.

STATEMENT REGARDING FEDERALLY SPONSORED RESEARCH OR DEVELOPMENT

Not applicable.

BACKGROUND OF THE INVENTION

1. Field of the Invention

The present invention relates generally to responding to an attribute of the quantum state of at least one entity, such as a photon or electron, that can be described by a quantum state. More specifically, the present invention relates to systems that are responsive to whether or not the quantum state of an entity is in a superposition of states, and relates as well to applications of these systems including quantum computation, quantum communication, and quantum cryptography, among others.

2. Related Art

In quantum mechanics it is well known that an entity, such as a photon or electron, can exist in a superposition of eigenstates of an observable. When two or more entities share a superposition of states they are "entangled", so that a particular measurement of the state of one of the entities can also alter the state of the other entangled entities, seemingly even without physical connection between the entities.

The Heisenberg uncertainty relations, which have been well-known since the 1930's, complicate the execution of quantum measurements. In the quantum formalism, observable physical quantities are described mathematically by operators. If two operators A and B are non-commuting (i.e. AB≠BA), then the measurement of either physical quantity represented by A or B will induce an uncertainty in the value of the other physical quantity. Although, in theory, the uncertainty in B induced by the measurement of A does not necessarily affect a subsequent measurement of A, in practice a previous measurement of A will often couple back to A via a "back-action" which can have significant consequences.

Discussions of how to avoid the consequences of back-action effects upon measurements expanded in the 1970's, and a substantial body of research has since developed. These measurement strategies are generally described as quantum nondemolition (QND) measurements. As related in "Quantum non-demolition measurements in optics", Nature 396, p. 537–542 (1998) by P.Grangier, J. A. Levenson, and J.-P. Poizat on page 537: "The key issue is to devise measurement schemes in which the back-action noise is kept entirely within unwanted observables, without being coupled back onto the quantity of interest. This quantity them remains uncontaminated by the measurement process, allowing repeated measurements to be performed with arbitrary high accuracy"; and as they further relate on page 540: "The main idea in QND strategy is to monitor a single observable that can be measured many times with the same result, identical to the first precise result if no external perturbation is applied." Others have since broadened their conception of what constitutes a QND measurement into associations with assorted measurement schemes that purport to leave a "quantum" quantity or entity enduring in some manner.

SUMMARY OF THE INVENTION

Aspects of the present invention can be considered to fall within a very broad construal of QND measurements, in that a portion of the scope of the present invention encompasses a form of quantum non-disturbance response. The meanings of the terms "response", "responding", and "responsive" as used herein include all manners of reactions to an interaction including, but not limited to, whether or not the interaction and/or the reaction is realized, potential, latent, unknown, indefinite, constrained, delayed, or even possible only in principle. In accordance with these terms' meanings herein, a measurement is a particular form of a response to an interaction, namely a reaction which produce information about the interaction. Measurements, therefore, are constituents of a subgroup of the overall group of responses. Measurements of physical quantities require a degree of prior knowledge about the entity being measured. Among the types of prior knowledge usually required for the execution of a QND measurement are identification of the entity (entities) being measured and at least partial constraints upon the possible quantum state(s) of the entity (entities) to be measured. The objectives of QND measurements have generally been determining the value of an observable, or a quantum state, of an entity in a repeatable or nondestructive manner. The scope of the term "entity", as used herein, is unlimited as long as such an entity is capable of at least possibly including at least one quantum state among its attributes. References to the term "entity" are considered to encompass, but are not limited to, the singular, the multiple, and the aggregate; the physical and the unphysical; as well as the realized and the virtual.

Protocols

A superposition of states confirming protocol (SOSCP) set of embodiments of the present invention includes systems and methods of executing a confirming form of response to a quantum state. The SOSCP set of embodiments are capable of confirming that the entity is in a superposition of states, such as a superposition of eigenstates of one of more observables. Without requiring the determination of an entity's particular quantum state, the present invention is capable of confirming that the entity is in a superposition of states. A superposition of states confirming/preserving protocol (SOSC-PP) set of embodiments of the present invention are able to execute the SOSCP without demolishing the entity's superposition of states.

Embodiments of the present invention can also be configured so as to include a capability of discerning entities that are in a superposition of states from those that are not. The capability of discerning whether or not entities are in a superposition of states can be implemented in a superposition of states preserving manner as well. Either or both of the discerning (SOSDP) or discerning/preserving (SOSD-PP) capabilities can be provided either separately from or in combination with capabilities of executing either the SOSCP or the SOSC-PP, or both.

In the descriptions of the present invention the terms confirming, discerning, responding, and similar related terms or variants thereof generally refer to the capability of both an affirmative as well as a negative effect. For example, a SOSCP can often indicate both a confirmation of the presence of a superposition of states, when its outcome is positive, as well as a confirmation of the absence of a superposition of states, when its outcome is negative. Absent a specific indication to the contrary, the present invention's description inherently contains this latitude of interpretation wherever potentially applicable.

Because entangled entities share at least one superposition of states, embodiments of the present invention are further capable of confirming that a first entity is in an entangled state without needing to interact with any other entity that is entangled with the first entity. Additionally, the various combinations of confirming, preserving, and/or discerning protocols described previously in regard to a superposition of states also apply to the present invention's capabilities of responding to a first entity's entanglement without needing to directly interact with any entangled counterpart of the first entity.

Comparably to the degree of advance knowledge that is required for certain measurements, a degree of advance knowledge may also be required for certain types of the responses referred to herein. For confirming an entity's entangled state, one such type of advance knowledge could be the general framework of the superposition of states shared by the entangled entities. Prior approaches to confirming the presence of entanglement have typically required either comparisons of measurements of at least two of the entangled entities to determine the presence (or absence) of entanglement, or at least one interaction between at least two of the entangled entities, such as in a Mach-Zender interferometer. In contrast, the present invention is capable of being responsive to the presence of entanglement by interacting with just a first entangled entity, and without requiring that the first entangled entity directly interact with any of the counterpart entangled entities with which the first entity is entangled.

In responding to an entity's entanglement, such as by confirming (or discerning) that entity's entanglement, the present invention is also capable of being responsive to other entities' entanglements. For entities that are entangled in at least one superposition of states, confirming (or discerning) that a first entity is entangled enables the present invention to establish that a second entity (which is known to have been entangled with the first entity) is in a superposition of states even though the present invention did not interact directly with that second entity. Additionally, the present invention is also able to confirm (or discern) the presence of entanglement without demolishing that entanglement. Still another feature of the present invention is the ability to execute the entanglement confirming or confirming/preserving responses while simultaneously also being capable of discerning entities that are entangled from those that are not. There is not any limit, in principle, to the number of entities whose entanglements can be responded to by executing a protocol according to the present invention on at least one of the entangled entities.

Applications

Among the various applications of the confirming/discerning/preserving protocols of the present invention described in detail herein are utilizations for quantum communication, quantum cryptography, and quantum computation purposes. Additional applications include utilizations for quantum teleportation, improved clock synchronization, quantum-enhanced positioning, and high precision measurements as well as improved frequency standards.

The present invention is capable of realizing a first manner of quantum communication with a signaling action that is executed by confirming or discerning an entity's entanglement. Given at least two entities that are initially entangled, confirming or discerning whether or not one entity's entanglement remains intact can reveal if action was taken to end a counterpart entity's entanglement. A signal can thus be sent from a sender that decides whether or not to end a superposition of states, or entanglement, of one of the entangled entities to a receiver that determines if the superposition of states, or entanglement, of a counterpart entity is intact. The signal thus sent by the first manner of quantum communication can be a simple yes/no indication (i.e. a single bit) of the presence of entanglement, or can include a more complex set of information.

Among the factors that can influence the complexity of information able to be sent in a signal with particular embodiments of the present invention are: the degree of entanglement of the entities, the number of dimensions in the Hilbert space occupied by the entities' quantum state(s), and the number of entities that are entangled. Unintended decoherences and factors specific to particular embodiments of the present invention can lead to other effects which may, in some circumstances, affect the complexity of information able to be included in a signal sent with the present invention.

An elementary signal class of embodiments of the present invention utilize the first manner of quantum communication. Even when an individual embodiment from the elementary signal class is able to transmit only a single bit (such as entanglement is present/absent) per entangled entity (or group of entangled entities), the complexity of information which can be transmitted by that individual embodiment is still potentially unlimited. By utilizing a sequence of entangled entities (or groups of entangled entities) in serial order, each transmitting a single bit of information, the total amount of information that can be transmitted is limited only by the number of entities (or groups of entities) utilized.

Within a multidimensional Hilbert space, an entity's overall quantum state can involve a composite superposition of states that is comprised of combinations of superpositions of states, wherein the various constituent superpositions of states can include superpositions of the eigenstates of differing dimensions of that entity's Hilbert space. In combination with an entity in such a composite superposition of states, the present invention provides further capabilities. Included among these further capabilities are means for a single entity to communicate multiple bits of information, means for a single interaction with an entity to execute multiple information processing operations, and means for simultaneously implementing multiple information encrypting schemes with a single entity.

A specialized configuration class of embodiments of the present invention incorporate specific configurations adapted for definitively confirming (or preserving) the presence of corresponding specific superpositions of states. Unless the appropriate specific configuration is employed, the yes/no confirming result cannot be relied on to accurately reflect the presence/absence of the corresponding specific superposition of states. The specialized configuration class of embodiments can be used for quantum cryptography, for example, when only those authorized to access the information possess knowledge of the appropriate specific configuration. Should the encrypted information be improperly accessed, it cannot be deciphered without knowledge of the specific configuration that corresponds to the specific superposition of states with which the information is encrypted.

For the specialized configuration class of embodiments, there is not, in principle, any limit to the number or variety of specific alternative configurations and corresponding specific superpositions of states that can be employed. Embodiments from the specialized configuration class are also able to achieve expanded capabilities by employing entities in composite superpositions of states. Included among these further capabilities are means for a single entity to communicate multiple bits of information with each specific configuration and corresponding specific superposition of states, means for a single interaction with an entity to execute multiple information processing operations per each specific configuration and corresponding specific superposition of states, and means for simultaneously implementing multiple information encrypting schemes per each specific configuration and corresponding specific superposition of states.

Alternatively, the specialized configuration class of embodiments can be used for quantum computing by using the specific configuration as a control factor in the construction of a logic gate. For example, a first processor can be in a first configuration capable of responding to whether or not a first specific superposition of states, and hence a first specific entanglement, is present. When the first processor is in the first configuration and responds to an absence of entanglement, it retains the same configuration. When the first processor is in the first configuration and responds to the presence of entanglement, it alters into a second configuration that is able to respond to whether or not a second specific superposition of states, and hence a second specific entanglement, is present. When the first processor is in the second configuration and responds to an absence of entanglement, it retains the same configuration. When the first processor is in the second configuration and responds to the presence of entanglement, it alters into the first configuration. Hence, with the specialized configuration class of embodiments and first and second entangled entities, actions to either preserve or demolish the superposition of states of the first entity can exert a controlling effect upon the first processor when it interacts with the second entity, and can thereby produce a configuration-altering linkage.

The configuration-altering linkage between first and second processors can be utilized as a base component of a computational process. In addition, each of the alternative configurations can be used to realize auxiliary functions, either individually or in combination with other computational processes. Moreover, both the first processor's configuration and any response resulting from that configuration can be back-linked to the second processor, so that the first processor can exert controlling actions upon the second processor as well.

Among other purposes, the configuration-altering linkage capability of the specialized configuration class of embodiments' can be of utility when combined with a selective mode class of embodiments which incorporate a selective mode feature. The selective mode feature operates by switching between a superposition of states (and hence entanglement) preserving mode and a superposition of states (and hence entanglement) demolishing mode. These modes differ qualitatively from the above described first and second configurations that enable responses to the presence of first and second superpositions of states, respectively. Either of these first or second configurations could also be selected to be in either preserving or demolishing modes. In the preserving mode, the configuration would operate similarly to the preserving protocols described earlier. In the demolishing mode, the configuration demolishes the superposition of states by, for example, executing a state determining observation that collapses the state of the entity into an eigenstate of the state determining observable. The demolishing action can occur either before or after the response to the superposition of states. When demolishing before responding, both configurations will respond to an absence of a superposition of states (and hence entanglement), regardless of whether or not the entity was initially in a superposition of states. Both when demolishing after responding and when preserving after responding, the entanglement may be either present or absent during the response, depending on whether or not the entity was in a superposition of states when the response began. The selective mode feature can be a potentially significant attribute when incorporated into embodiments of the present invention, including quantum communication and quantum cryptography applications, as can the other features of the quantum computation applications described above.

A first entity sequence comprised of entities that are each potentially in superpositions of states can provide embodiments of the present invention with added capacities. These embodiments' operations can be time-coordinated to coincide with their interactions with the entities in the first sequence. A first protocol sequence is comprised of a multiplicity of protocols. The manner of operation of any protocol in the first protocol sequence can be selectively responsive to the manners of operation or results of the other protocols in the first protocol sequence. The development of the first protocol sequence, either in part or in whole, can thereby be differentially directed by the responses of the individual protocols in the first protocol sequence as well as by the individual dispositions of the entities the first protocol sequence interacts with. The first protocol sequence can also be controlled to operate in concert with, or in response to, the results and operations of a second protocol sequence that interacts with a second entity sequence, where the entities in the second entity sequence are the entangled counterparts of the entities in the first entity sequence that interacts with the first protocol sequence.

The operations of a recurrence class of embodiments of the present invention involve repeatedly confirming/preserving the superposition of states of a single entity. (The recurrence class of embodiments as described can alternatively involve repeatedly discerning/preserving the superposition of states of a single entity.) Each successive repetition of confirming/preserving (or discerning/preserving) the superposition of states of a first entity that is initially in a superposition of states responds to the presence of a superposition of states until a second entity, which is the entangled counterpart of the first entity, has its superposition of states demolished. Because the execution of a SOSC-PP (or SOSD-PP) does not end an entity's intact superposition of states, an entity's present superposition of states can be demolished by the modification of a SOSCP (or SOSDP) from a preserving to a demolishing protocol, even when the entity interacted with that protocol in the past. This retroactive effect is an example of a "delayed-choice" action that is a well-known type of quantum phenomena. With a delayed-choice response, it is possible to choose the form of the response, and hence the possible response outcomes, after the interaction between the responding system and the entity has already occurred. In this way, not only can a first SOSCP (or SOSDP) be executed after it is no longer physically interacting with the entity, but the first SOSCP (or SOSDP) can be executed even after the entity has interacted with a subsequent, second SOSCP (or SOSDP). The first and second SOSCPs (or SOSDPS) can be separate protocols, or the same protocol that the entity cycles through successively.

A protocol network class of embodiments of the present invention utilize networks of interrelated protocols, some or all of which may include delayed-choice responses. When utilizing delayed-choice responses, the protocol network class of embodiments is capable of not only controlling which protocol responses occur, the order in which they occur, the form of response each protocol produces, and the response outcomes; but is also capable of controlling these all so that they are realized after the physical interactions between the entities and the systems has ended. Among the benefits of this approach, if the delayed-choice network is setup for quantum computing, for example, is an essentially instantaneous rate of computation (outside of the transit time of the entities progressing through the various protocols in the network).

Other objects and features will be in part apparent and in part pointed out hereinafter.

BRIEF DESCRIPTION OF THE DRAWINGS

FIG. 7 shows a schematic perspective view of an interrelated optical apparatuses embodiment of the present invention.

FIG. 8 shows a schematic expanded perspective view of a first detail of the interrelated optical apparatuses embodiment shown in FIG. 7.

FIG. 9 shows a schematic expanded cross-sectional side view of a second detail of the interrelated optical apparatuses embodiment shown in FIG. 7.

DETAILED DESCRIPTION OF THE EXEMPLARY EMBODIMENTS

Figure 1:
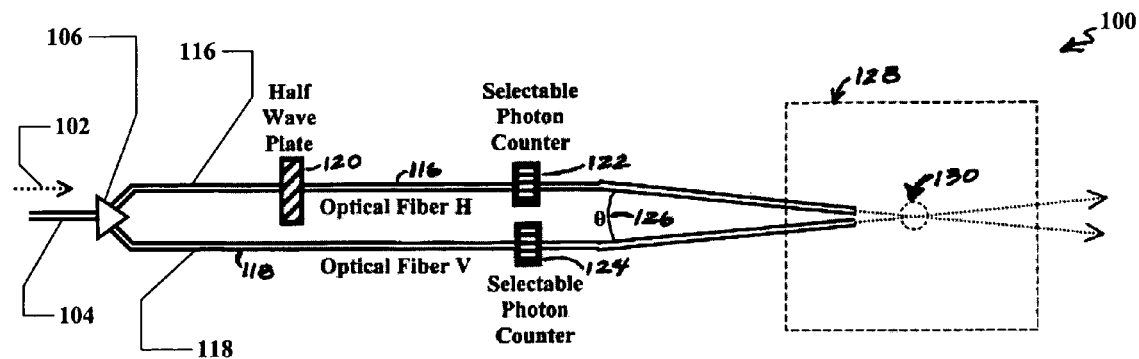
FIG. 1 shows a schematic cross-sectional side view of a focused-intersection optical embodiment of the present invention.

In the following description, identical numbers indicate identical elements. Where an element has been described in one Figure, and is unaltered in detail or relation in any other Figure, said element description applies to all of the Figures.

The various embodiments of the present invention generally involve providing a means for an entity to potentially be capable of interfering with itself when that entity is potentially in a superposition of quantum states. Often, the capability of exhibiting destructive self-interference is of particular significance. The various embodiments further involve providing a means for conditionally interacting with the potentially self-interfering entity; wherein the outcome of the conditional interaction varies depending at least in part on the entity's potential self-interference.

Superpositions of States

Providing the capability of conducting superposition of states confirming protocols (SOSCPs) is integral to multiple embodiments of the present invention. The quantum state of an entity in a superposition of states (of a single observable) can be generally represented by $\Psi=c_1|A_1>+c_2|A_2>+ \ldots +c_n|A_n>$, where $c_1$ through $c_n$ are coefficients and $|A_1>$ through $|A_n>$ are eigenstates of the observable A. In the following description the observable A is assumed to occupy a two dimensional Hilbert space (i.e. $\Psi=c_i|A_i>+c_j|A_j>$), but this assumption is made only for clarity of description. Analogous SOSCPs are similarly applicable to observables with higher dimensioned Hilbert spaces, and the present invention encompasses the application of SOSCPs to any quantum state that is potentially in a superposition of states in a Hilbert space of any number of dimensions. Examples of two dimensional quantum states are $\Psi_e=C_1|\uparrow>+C_2|\downarrow>$ for an electron in a superposition of spin-up and spin-down eigenstates, and $\Psi_\nu=c_3|H>+c_4|V>$ for a photon in a superposition of horizontal and vertical polarization eigenstates.

While the different eigenstates of an observable are orthogonal in the relevant Hilbert space, entities in differing eigenstates may or may not be capable of interference effects. For constructive or destructive interference to occur, the phases of the two entities need to be appropriately aligned. For constructive interference their phases coincide (i.e. are in phase), and for destructive interference their phases are opposed (i.e. are $\pi$ out of phase).

For an entity in a superposition of states such as $\Psi_e$ described above, a more generalized representation would be $\Psi_e=c_1|\uparrow>+c_2e^{i\Phi}|\downarrow>$ wherein the spin-up and spin-down components are $\Phi$ out of phase. The SOSCPs are described for $\phi=0$, but can also be applied controllably, with certain modifications, for a nonzero $\phi$ if that $\phi$ is known or discernable. Selectable phase shifts can be applied where necessary, to achieve the desired phase alignments. For the purposes of this summary, the case where $\Phi=0$ will be described, and the appropriate modifications for nonzero $\phi$ are well known and extensively described in the research literature.

It is also well known that in the following prototypical SOSCP description it can be assumed, without a loss of generality, that the initial state of the entity under consideration is $\Psi=1/\sqrt{2}(|0>+|1>)$, where the coefficients are taken to be equal and normalized, and the orthogonal eigenstates are described in a generalized computation basis (where the states $|0>$ and $|1>$ correspond to the two alternative values for a single bit). Equivalent SOSCPs for entities with less constrained initial states, described in less restricted basis states, are readily derivable through well known generalizations of the following SOSCP. It is also assumed that the entity under discussion is an example of the first situation in which the two orthogonal basis states do not interfere, akin to the horizontal and vertical polarization states of a photon.

Superposition of States Confirming Protocols

A series of operations comprise the core of a prototypical SOSCP. Each of these core operations may include single or multiple actions which may be grouped into sub-operations, so that a combination of these actions or groups produces the core operation under consideration. Included among these prototypical SOSCP core operations are:

1. An eigenstate distinguishing operation that is capable of distinguishing between component eigenstates and enables a separate action to be executed upon at least one of the component eigenstates.
2. An eigenstate altering operation that is capable of altering of at least one of the component eigenstates so that the component eigenstates are then capable of revealing interference effects that may include complete destructive interference.
3. A phase aligning operation that provides a means to selectively influence the phase of each of the component eigenstates.
4. A destructively interfering operation that recombines the phase aligned, interference capable component eigenstates potentially produced by the prototypical SOSCP core operations 2 and 3. The component eigenstates are recombined so that, at minimum, evidence of destructive interference is capable of being revealed, and at maximum, complete destructive interference is approached in a selectively controllable manner.
5. A conditionally responding operation that potentially interacts with the phase aligned, interference capable component eigenstates during their recombination in the destructively interfering operation. If the recombined components do not reveal evidence of destructive interference, then the potential response is realized; while if the recombined components do reveal evidence of destructive interference, then the potential response is unrealized. An indication that the potential response was realized confirms that the entity was initially in a superposition of states.

An element of the present invention that is capable of effecting the above described eigenstate distinguishing operation is correspondingly termed a state distinguisher. An element of the present invention that is capable of effecting the above described eigenstate altering operation is correspondingly termed a state conditioner. An element of the present invention that is capable of effecting the above described phase aligning operation is correspondingly termed a state conditioner. The state conditioner (also referred to as a preparatory conditioner, when the eigenstate altering and/or phase aligning operations condition the entity's state in preparation for a subsequent operation) will regularly be comprised of at least the eigenstate altering operation, and will often include the phase aligning operation, when the appropriate phase alignment is at least potentially not present. An element of the present invention that is capable of effecting the destructively interfering operation, and related later described operations that are capable of revealing manifestations of interference, are accordingly termed interference actuators.

The descriptions herein of protocols, where directed primarily to superpositions of eigenstates, are so directed solely for clarity of illustration purposes. Protocols according to the present invention are not limited to distinguishing between eigenstates, nor are they limited to superpositions of states that are explicitly expressible as superpositions of eigenstates. Protocol operations can also involve broader quantum states which comprise any superposition of states that is capable of self-interfering. The cardinal characteristics of these broader quantum states that enables their utilization is first, a capacity for their superposition of states to be distinguished into at least two components, so that separate operations are capable of being performed upon at least one of the distinguished components; and second, a capacity for the distinguished components, with suitable modifications, to be capable of exhibiting evidence of interference with each other. The formats of the protocols described herein are hence generally adaptable for operating with these broader quantum states. Correspondingly, protocol applications according to the present invention are also generally adaptable for operating with these broader quantum states.

A focused intersection optical apparatus embodiment 100 of the present invention schematically depicted in FIG. 1 provides a first means of physical realizing the operations of the prototypical SOSCP. The entities utilized by the focused intersection optical apparatus embodiment 100 are photons that are schematically depicted as traveling in the direction 102 when incoming along the optical fiber 104. For the suitable embodiments of the present invention, entity paths that are shown as being constrained by elements such as optical fiber 104 can often also be configured with a free (i.e. unconstrained) path, so long as they are appropriately directed and factors such as loss and dispersion are controllable, hence it should be understood that the scope of the present invention also encompasses these alternative embodiments. The eigenstate distinguishing operation of the focused intersection optical apparatus embodiment 100 involves the well known means of producing photons in a superpositions of horizontal and vertical polarization states through type II spontaneous parametric down conversion. These photons in superpositions of horizontally and vertically polarized states travel in direction 102 along optical fiber 104 to a state distinguisher. In the focused intersection optical apparatus embodiment 100 the state distinguisher is a suitably aligned bi-refringent crystal 106 that directs each polarization component of the photon in differing directions. A horizontally polarized component of the photon is directed along path 112, and a vertically polarized component is directed along path 114, wherein both of paths 112 and 114 generally progress from left to right in direction 102 as depicted in FIG. 1. The horizontally polarized component path 112 proceeds along optical fiber H 116 and the vertically polarized component path 114 proceeds along optical fiber V 118. In this embodiment, the eigenstate altering operation is achieved by passing the optical fiber H 116 through a half wave plate 120 thereby rotating the polarization of the horizontally polarized photon component by $\pi/2$. By effecting the $\pi/2$ rotation of the horizontally polarized photon component, the half wave plate 120 functions as the state conditioner in the focused intersection optical apparatus embodiment 100, and prepares the condition of the horizontally polarized photon component for following operations. After passing through the half wave plate 120, the photon component proceeding along optical fiber H 116 is polarized in the vertical direction. To ensure clarity in the subsequent descriptions, the photon component which was originally polarized in the horizontal direction will continue to be referred to as the horizontally polarized component, even when its polarization direction has been rotated to the vertical direction. The choice of which path to pass through the half wave plate is not critical, as long as just one path passes through it. The optical fibers H 116 and V 118 then pass through selectable photon counters 122 and 124, respectively. Inclusion of the selectable photon counters is an optional feature that is relevant for later described embodiments which involve the option of selectively preserving or demolishing photons' superpositions of states. The selectable photon counters 122 and 124 are capable of counting the passage of a photon only if selected to do so. The selectable photon counters 122 and 124 are configured so that they cannot, even in principle, register the passage of a photon when unselected, and hence will not demolish the photon's superposition of linearly polarized states unless they are expressly selected.

After passing through the selectable photon counters 122 and 124, The optical fibers H 116 and V 118 direct the paths 112 and 114, respectively, to intersect at a crossing angle $\theta$ 126. A general region of intersection 128 encompasses the area where the paths 112 and 114 cross. Within the region of intersection 128 is an interference zone 130 where the photon components directed on paths 112 and 114 are potentially capable of revealing interference effects. The focused intersection optical apparatus embodiment 100 can accomplish the phase aligning operation by controlling the lengths along the two paths 112 and 114 so that the two photon components arrive at the interference zone 130 $\pi$ out of phase. Alternatively, one or more well known types of phase shifters (not shown) can be arranged along either or both of the paths 112 and 114 for accomplishing the $\pi$ phase shift of the phase aligning operation. By effecting the phase aligning operation (when required), the phase shifter and/or path length control function as facets of the state conditioner in the focused intersection optical apparatus embodiment 100, and prepare the condition of the photon components for following operation. The destructively interfering operation is accomplished by the crossing of the paths 112 and 114 at the interference zone 130, and hence the crossing paths defined by the right terminal ends of the paths 112 and 114 are the interference actuator of the focused intersection optical apparatus embodiment 100. Within the general region of intersection 128, the conditionally responding operation can be accomplished in differing ways. Three examples of the variety of means available for realizing the conditionally responding operation are described in FIGS. 2, 3, and 4.

Depending on the entity and the physical apparatus being employed, different technical constraints can influence the realization of the conditionally responding operation. Among the principal sources of these constraints is that quantum phenomena often display probabilistic characteristics. The consequences of these probabilistic characteristics need to be accounted for in order to produce outcomes that are either definite or deterministic. Outcomes that are probabilistic themselves can also be utilized, and in such a case the qualities of the outcomes can be established by statistical means. For particular applications or objectives, a statistically indicated outcome may be sufficient. In other instances, a definite and/or deterministic outcome for an individual entity is preferable. Statistical indications are well known in quantum physics, where discussions of ensembles of identical systems are a standard tool. The achievement of definitive and controllable indications for individual quantum entities, though more problematic, can provide substantial potential benefits.

Although the description of the focused intersection optical apparatus embodiment 100 is directed towards conducting the prototypical SOSCP, it should be understood that the focused intersection optical apparatus embodiment 100 is also adaptable for conducting prototypical SOSDPs as described in more detail immediately following. Although the optical embodiments are described as utilizing photons in superposition of linear polarization states, it should be understood that the scope of the present invention also includes alternative optical embodiments that can, with the appropriate well known modifications, utilize circular, elliptical, and other polarization states as well.

Figure 2:
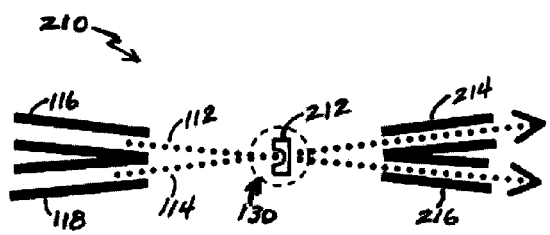
FIG. 2 shows a first expanded schematic cross-sectional side view of a detail of the focused-intersection optical embodiment shown in FIG. 1.
Figure 4:
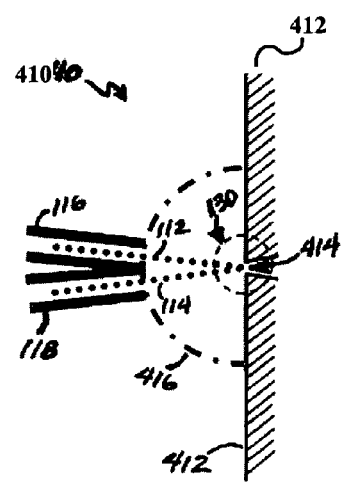
FIG. 4 shows a third expanded schematic cross-sectional side view of a detail of the focused-intersection optical embodiment shown in FIG. 1.
Figure 3:
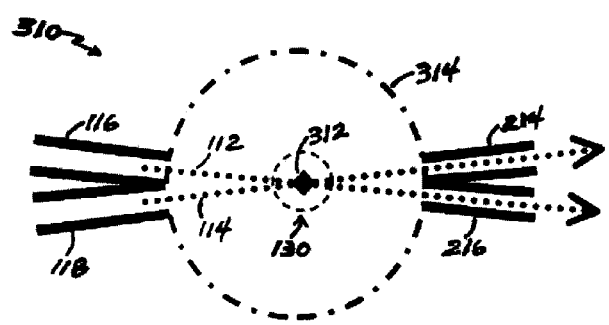
FIG. 3 shows a second expanded schematic cross-sectional side view of a detail of the focused-intersection optical embodiment shown in FIG. 1.

The focused intersection optical apparatus embodiment 100 is adaptable for both statistical measures of ensembles of entities as well as approaches that are focused on producing functional performance with individual entities. The various means for conducting the conditionally responding operation are generally disposed within the region of intersection 128 of FIG. 1. The three approaches depicted in FIGS. 2, 3, and 4 are a fraction of all possible means of conducting the conditionally responding operation, and do not preclude the employment of alternative approaches that can achieve the desired objectives. Any approach to conducting the conditionally responding operation that is capable of enabling performance of the functions of any embodiment of the present invention, when utilized in concert with the other aspects of those embodiments, is within the scope of the present invention.

FIG. 2, a first expanded view of the region of intersection 128 in FIG. 1, depicts a photo detector approach 210 for conducting the conditionally responding operation. The horizontally and vertically polarized component paths 112 and 114, respectively, intersect at the interference zone 130. A photon detector 212, such as a charge coupled device, is disposed within the interference zone 130. Optimally, the photon detector is configured so that it is disposed as entirely as possible within the interference zone 130. This configuration is designed to minimize any interaction between the photon components' wave functions and the photon detector 212 outside the interference zone 130. Photon detectors 212 that extend outside of the interference zone 130 may also be utilized and fall within the scope of the present invention as well, but it is preferable that the amount of the photon detector 212 extending outside of the interference zone 130 is minimized. When the horizontally and vertically polarized components exhibit destructive interference in the interference zone 130, the photon detector 212 will optimally not register the presence of a photon, and the horizontally and vertically polarized components, after passing the photon detector 212, will continue along the paths 112 and 114, respectively. Optionally, the continuing vertically and horizontally polarized components can then be directed along the uptake optical fibers V 214 and H 216, respectively. When the photon components do not exhibit destructive interference, the photon detector will optimally register the presence of a photon and thereby indicate, absent unintended decohering effects, that the original photon that the prototypical SOSCP is being conducted on was not in the superposition of linearly polarized states. The lack of a registering of a photon by the photon detector 212 indicates that the photon was in the superposition of linearly polarized states. The registering of a photon, or lack thereof, by the photon detector 212 corresponds to the conditionally responding operation's indication that the potential response is realized. Among the issues relating to the photo detector approach 210 are the wavelength of the photon, the physical dimensions of the photon detector 212, the dispersion of the photon components once emitted from the ends of the optical fibers 116 and 118, the optical properties of the medium in which the photons propagate following their emission from the ends of the optical fibers 116 and 118 as well as their path lengths within this medium, and other factors that can influence the focusing and the degrees of freedom of the photon components when within this medium. A number of well known tactics and options are available for addressing these issues. The particular choices of which tactic or option to utilize will also be affected by other issues, such as which photon wavelength minimizes absorption in a specific optical fiber material, or maximizes the detection efficiency of a specific type of photon detector.

FIG. 3, a second expanded view of the region of intersection 128 in FIG. 1, depicts a scattering approach 310 for conducting the conditionally responding operation. Much of the scattering approach 310 is equivalent to the photo detector approach 210, and most of the same issues and considerations apply to both approaches. The principle differences in the scattering approach 310 are the replacement of the photon detector 212 with a scattering element 312 disposed within the interference zone 130, and the addition of a surrounding photon detector 314. Similarly to the photon detector 212, the scattering element 312 is optimally configured so that it is disposed as entirely as possible within the interference zone 128. Also similarly to the photon detector 212, scattering elements 312 that extend outside of the interference zone 130 can also be utilized and fall within the scope of the present invention, but it is preferable that the amount of the scattering element 312 extending outside of the interference zone 130 is minimized. When the scattering element 312 approaches the preferential disposition within the interference zone 130, its effect on the photon components that exhibit destructive interference in the interference zone 130 is minimized. Optimally, the scattering of the destructively interfering photon components off the scattering element 312 is sufficiently small enough to be distinguished from the scattering of photon components that exhibit lesser degrees of destructive interference in the interference zone 130. The surrounding photon detector 314 surrounds the interference zone 130 and the scattering element 312, and provides the capability of detecting photon scattering off the scattering element 312 with sufficient discrimination to distinguish between relative degrees of destructive interference exhibited within the interference zone 130. The optical fibers 116 and 118 direct the horizontally and vertically polarized component paths 112 and 114 into the region within the surrounding photon detector 314. Optionally, continuing photon components can be directed along the uptake optical fibers V 214 and H 216, respectively. The detection of scattering with sufficient discrimination, or lack thereof, by the surrounding photon detector 314 corresponds to the conditionally responding operation's indication that the potential response is realized.

FIG. 4, a third expanded view of the region of intersection 128 in FIG. 1, depicts an imperfect mirror approach 410 for conducting the conditionally responding operation. As with the two previous approaches, in the imperfect mirror approach 410 the optical fibers 116 and 118 also direct the horizontally and vertically polarized component paths 112 and 114, respectively, to intersect at the interference zone 130. An imperfect mirror 412 is disposed approximately normal to the plane of the horizontally and vertically polarized component paths 112 and 114 (the imperfect mirror 412 is also depicted as approximately normal to the plane of FIG. 4). The imperfect mirror 412 is depicted as being planar for simplicity of description, but can also be shaped with other geometries in response to situational circumstances. A gap 414 in the imperfect mirror 412 is sized so as to be preferably disposed entirely within the interference zone 130 when the imperfect mirror 412 is placed so that the component paths 112 and 114 intersect at the gap 414. Once again, similarly to the photon detector 212 and the scattering elements 312, gaps 414 that extend outside of the interference zone 130 can also be utilized and fall within the scope of the present invention, though it is preferable that the amount of the gap 414 extending outside of the interference zone 130 is minimized. The photon components emitted from the optical fibers 116 and 118 are reflected from the imperfect mirror 412 and can be registered by a semi-surrounding photon detector 416. The effect of the gap 414 on the reflection off the imperfect mirror 412 depends in part on whether or not the incident photon is in the superposition of horizontally and vertically polarized states. For an incident photon that is not in the superposition of linearly polarized states, reflection from the imperfect mirror 412 with the gap 414 is capable of being distinguished by the semi-surrounding photon detector 416 from reflection from a perfect mirror without the gap 414. For an incident photon that is in the superposition of linearly polarized states, effects of destructive interference of the horizontally and vertically polarized components in the interference zone 130 will lessen the effect of the gap 414 on their reflection and hence, the semi-surrounding photon detector 416 will be less capable of distinguishing their reflection off of the imperfect mirror 412 from their reflection from a perfect mirror. The attaining of sufficient discrimination to distinguish reflection off of the imperfect mirror 412 from reflection off of a perfect mirror, or lack of the attaining thereof, by the semi-surrounding photon detector 314 corresponds to the conditionally responding operation's indication that the potential response is realized.

Optionally, the reflected photon components can be directed along reflected uptake optical fibers (not shown) that are similar to uptake optical fibers V 214 and H 216. In this optional disposition, the imperfect mirror could be inclined at an angle that would not reflect the photon components back at the optical fibers 116 and 118, such as arranging the imperfect mirror at an angle that is not normal to the plane of FIG. 4. The optional inclination of the imperfect mirror would direct the reflected photon components for receipt by the reflected uptake optical fibers, so that the semi-surrounding photon detector 416 would primarily register a signal due to the imperfect reflection that results from an incident photon that is not in the superposition of linearly polarized states, and would be less likely to register a signal when the incident photon is in the superposition of linearly polarized states.

An element of the present invention that is capable of effecting the above described eigenstate distinguishing operation is correspondingly termed a state distinguisher. An element of the present invention that is capable of effecting the above described eigenstate altering operation is correspondingly termed a state conditioner. An element of the present invention that is capable of effecting the above described phase aligning operation is correspondingly termed a state conditioner. The state conditioner (also referred to as a preparatory conditioner, when the eigenstate altering and/or phase aligning operations condition the entity's state in preparation for a subsequent operation) will regularly be comprised of at least the eigenstate altering operation, and will often include the phase aligning operation, when the appropriate phase alignment is at least potentially not present. An element of the present invention that is capable of effecting the destructively interfering operation, and related later described operations that are capable of revealing manifestations of interference, are accordingly termed interference actuators.

Figure 5:
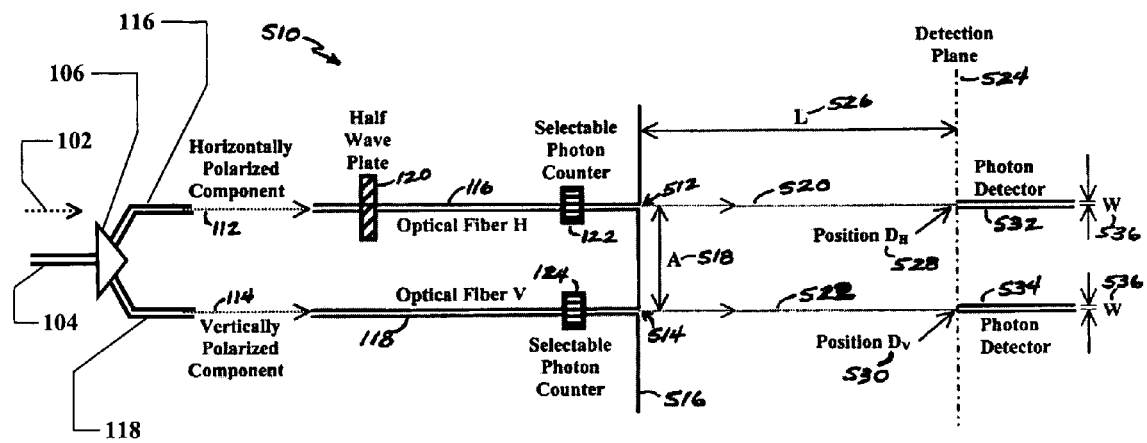
FIG. 5 shows a schematic cross-sectional side view of a pattern-based optical embodiment of the present invention.

A pattern-based optical apparatus embodiment 510 is schematically depicted in FIG. 5. From its initiation through to when the photon components pass the selectable photon counters 122 and 124, the pattern-based optical apparatus embodiment 510 is equivalent to the focused intersection optical apparatus embodiment 100. After passing the selectable photon counters 122 and 124, the optical fibers H 116 and V 118 terminate at emitting locations 512 and 514, respectively. The emitting locations 512 and 514 are depicted as arranged on an emission plane 516 for simplicity, although other arrangements can be utilized as long as the relative positions of the locations 512 and 514 are known. The locations 512 and 514 are separated by a distance A 518 along the emission plane 516. The ends of the optical fibers H 116 and V 118 are depicted as arranged in parallel orientations at right angles to the emission plane 516 for simplicity, although other arrangements can also be utilized. The end of the optical fiber H 116 is aligned in a direction H 520 and the end of the optical fiber V 118 is aligned in a direction V 522. The directions H 520 and V 522 are parallel and separated by the distance A 518. A detection plane 524 is parallel to, and is a separation L 526 from the emission plane 516. The direction H 520 intersects the detection plane 524 at a position $D_H$ 528 and the direction V 522 intersects the detection plane 524 at a position $D_V$ 530 so that the positions $D_H$ 528 and $D_V$ 530 are then also separated by the distance A 518. Photon detectors 532 and 534 have their apertures located at the positions $D_H$ 528 and $D_V$ 530, respectively. The apertures of the photon detectors 532 and 534 have openings of widths W 536.

When a photon that enters the pattern-based optical apparatus embodiment 510 is in the superposition of linearly polarized states, the photon components that are emitted from the optical fibers H 116 and V 118 can have a controllable phase relationship between them. Since the wavelength of the photon components is known, the distance A 518 and the separation L 526 can be chosen to produce a selected interference pattern (not shown) at the detection plane 524. By providing the conditions in which the photon components can potentially interfere, the region of the first EM embodiment 610 between the emission plane 516 and the detection plane 524, inclusive, functions as this embodiment's interference actuator because it is not possible to conclsively distinguish which of the locatons 512 and 514 emitted a given photon when it arrives at detection plane 524. The selected interference pattern can have its central maxima centered between the positions $D_H$ 528 and $D_V$ 530, and its first minima on either side of its central maxima centered at the positions $D_H$ 528 and $D_V$ 530. When a photon that enters the pattern-based optical apparatus embodiment 510 is not in the superposition of linearly polarized states, the photon is either emitted at the location 512 from the optical fiber H 116 or at the location 514 from the optical fiber V 118, and is initially directed in the direction H 520 or the direction V 522, respectively. Consequently, the probability distribution of the position at which the photon will reach the detection screen 524 is a Gaussian distribution centered on either the position $D_H$ 528 for a photon emitted by optical fiber H 116, or centered on the position $D_V$ 530 for a photon emitted by optical fiber H 118. Thus, when photons are not in the superposition of linearly polarized states, there is a maximum probability that the individual photons are detected at the positions $D_H$ 528 or $D_V$ 530; and when the photons are in the superposition of linearly polarized states, there is a maximum possible reduction in probability of detecting the photons at the positions $D_H$ 528 and $D_V$ 530, in comparison to when the photons are not in the superposition of linearly polarized states. The contrast in probability of detection by the photon detectors 532 and 534 can be adjusted by varying the photon detector aperture widths W 536. A greater width W 536 is desired to enable higher photon counts when the photons are not in the superposition of linearly polarized states, while a lesser width W 536 is desired to enable lower photon counts when the photons are in a superposition of linearly polarized states. Since the goal is to maximize the contrast between the two situations, an optimal width W 536 will be determined according to the individual circumstances of the photon wavelengths, the sensitivities of the photon detectors 532 and 534, the specific geometries employed and other particular details of a given realization of the pattern-based optical apparatus embodiment 510.

The pattern-based optical apparatus embodiment 510 discriminates photons that are in the superposition of linearly polarized states from those that are not by statistical analyses of aggregate numbers of photons. This embodiment's prototypical SOSCP execution is implemented in concert with a series of similarly constituted photons that differ most significantly by whether or not they are in the superposition of linearly polarized states. While the pattern-based optical apparatus embodiment 510 requires multiple photons, it compensates by enabling prototypical SOSCPs to be executed the with fewer technical constraints.

Figure 6:
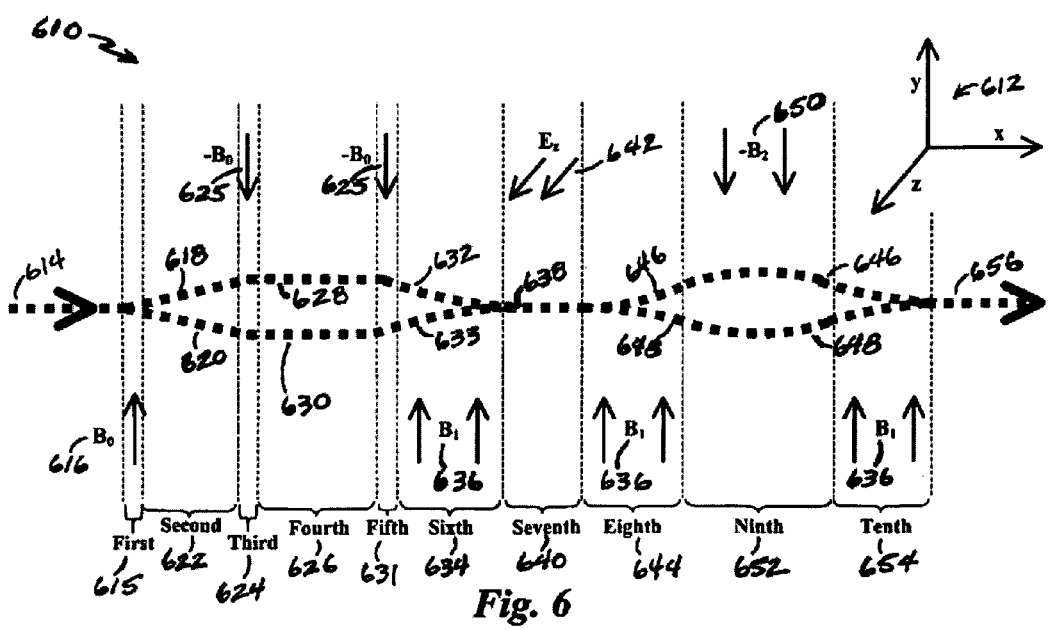
FIG. 6 shows a schematic side view of an electromagnetic embodiment of the present invention.

A first electromagnetic (EM) embodiment 610 is schematically depicted in FIG. 6. FIG. 6 shows a side view perspective of the path(s) of an electrically charged entity, such as an electron, through the first EM embodiment 610. The initial description of the first EM embodiment 610 will be directed towards its execution of the prototypical SOSCP on electrons, with the understanding that its operation can involve any entity that is capable of being influenced by EM fields. A reference coordinate system 612 illustrates the defined orientations of the relative x, y, and z axes for the view of FIG. 6. As depicted, the positive x axis lies in the plane of FIG. 6 and points to the right, the positive y axis lies in the plane of FIG. 6 and points up, and the positive z axis is normal to the plane of FIG. 6 and points at the viewer. All directional references in the description of FIG. 6 are defined in terms of this coordinate system, unless specifically stated otherwise. Electrons progress from left to right in FIG. 6. The following description will be directed first to the operation of the first EM embodiment 610 for an electron which is in a superposition of spin states, and will then be directed second to its operation with an electron that is not in the superposition of spin states. For clarity of description only, the electron is assumed to be in the earlier described state $\Psi_e = c_1 |\uparrow\rangle + c_2 |\downarrow\rangle$, where $c_1$ and $c_2$ can be taken to be equal without loss of generality. Other suitable superpositions of spin states are also capable of being utilized, with the appropriate modifications to the first EM embodiment 610, and the use of the state $\Psi_e$ in this description is not limiting.

Electrons enter the first EM embodiment 610 moving in the initial direction 614. The electrons undergo the eigenstate distinguishing operation when they pass through a first sector 615 that confines a magnetic field $B_0$ 616 that is directed in the positive y direction. The eigenstate distinguishing operation is achieved when the paths of the two components of the electrons diverge due to this field. The magnetic field $B_0$ impels the path of a parallel spin (i.e. spin-up) component 618 in the positive y direction, while it impels the path of an antiparallel spin (i.e. spin-down) component 620 in the negative y direction. The magnetic field $B_0$ in the first sector 615 operates as the state distinguisher in the first EM embodiment 610 by effecting the spatial divergence of the spin-up 618 and spin-down 620 components, and prepares the conditons of the electron components for following operations. The ten successive sectors, from left to right, of the first EM embodiment 610 are electromagnetically shielded (not shown), by any of a number of well known ways, from the fields in the other sectors so that the fields in one sector do not materially affect electrons in the other sectors. A spatial separation develops between the path of the spin-up component 618 and the path of the spin-down component 620 as they progress through an EM field-free second sector 622. In a third sector 624 a magnetic field $-B_0$ 625 directed in the negative y direction counters the diverging movement of the spin-up and spin-down components so that they progress into a fourth sector 626 in substantially parallel paths 628 and 630, respectively. The eigenstate altering operation and the phase aligning operation facets of the preparatory state conditioner are disposed in the fourth sector 626. The eigenstate altering operation involves flipping the spin of one of the spin components traversing either path 628 or 630, by at least one of an assortment of well known means. After ensuring that the flipping effect is isolated to affecting just one of the spin component paths 628 and 630 by an appropriate shielding, the spin flip can be accomplished by brute force EM fields, or by the application of a more judicious procedure such as a Datta-Das spin FET. The phase aligning operation functions by selectively modifying (via any of a number of well known means) the phase of at least one of the spin components of the electron traversing paths 628 and 630 so that they are subsequently $\pi$ out of phase.

The fourth sector 626 also provides an opportunity to respond to the spin states of the electron progressing through the first EM embodiment 610. The electron's spin can be responded to by any means capable of distinguishing between the paths 628 and 630. However, the electron's superposition of spin states will be demolished when the means to distinguish between the paths 628 and 630 is capable of being conducted, even if only in principle, in the fourth sector 626. To be capable of selectively conducting the prototypical SOSCP as either a preserving or demolishing protocol with the same realization of the first EM embodiment 610, the means for responding to the electron's spin, such as distinguishing between the paths 628 and 630, cannot be possible, even in principle, except when conducting the prototypical SOSCP as a demolishing protocol. The magnetic field $-B_0$ 625 is also applied in a fifth sector 631 to redirect the spin-up component path 628 and the spin-down component path 630 into converging paths 632 and 633, respectively. A sixth sector 634 confines a magnetic field $B_1$ 636 in the positive y direction that is of a lesser magnitude than the magnetic field $-B_0$ 625, but is applied across the entire breadth of the sixth sector 634. The sixth sector 634 is of greater extent in the x direction than the fifth sector 631, the third sector 624, or the first sector 614. In the sixth sector 634 the rate of convergence of the paths 632 and 633 is progressively moderated so that the paths coincide in a single path 638 through a seventh sector 640, and thereby achieve the destructively interfering operation, and hence function as an interference actuator, by recombining the two phase aligned spin components of the electron throughout the seventh sector 640. The seventh sector 640 confines an electric field $E_z$ 642 directed in the positive z direction that will impel an electron present in the seventh sector 640 out of the plane of FIG. 6 to enable the conditionally responding operation. Because an electron that was originally in the superposition of spin states is destructive interfering with itself while traversing the path 638 through the seventh sector 640, it will not experience the electric field $E_z$ 642 and continues along the path 638 to an eighth sector 644 without leaving the plane of FIG. 6. An electron that was not originally in the superposition of spin states will not be destructively interfering in the seventh sector 640, and hence will experience the electric field $E_z$ and be impelled out of the plane of FIG. 6. An electron detector (not shown) can be situated so that it will register an electron that is impelled out of the plane of FIG. 6 and thereby provide the capability of implementing the conditionally responding operation.

The eighth sector 644 also confines the magnetic field $B_1$ 636. The influence of the magnetic field $B_1$ 636 in the eighth sector 644 progressively separates a path 646 of the spin-up component from a path 648 of the spin-down component. A magnetic field $-B_2$ 650 directed in the negative y direction is confined within a ninth sector 652 and impels the paths 646 and 648 to progressively cease diverging and then commence converging as the electron spin-up and spin-down components traverse the ninth sector 652. The separation between the paths 646 and 648 in the ninth sector 652 provides opportunities to execute differential operations on the electron spin components. These operations can include, among others, the selective option to conduct the superposition of spin states demolishing response to the spin of the electron components similarly to the selective option referred to previously in the description of the fourth sector 626. Demolishing the superposition of spin states in the ninth sector 652, rather than in the fourth sector 626, enables the electron's superposition of spin states to be confirmed before it is demolished, whereas demolishing the electron's superposition of spin states in the fourth sector 626 precludes the ability to confirm the electron's superposition of spin states. Another form of operation that can be conducted in the ninth sector 652 enables the electron to be restored to the original superposition of spin states in which it entered the first EM embodiment 610, and is described in the next section relating to superposition of spin states preserving protocols. When the converging paths 646 and 648 transit beyond the ninth sector 652 they enter a tenth sector 654 which also confines the magnetic field $B_1$ 636. The extent of the tenth sector 654 in the x direction can be controlled so that the effect of the magnetic field $B_1$ 636 progressively slows the convergence of the paths 646 and 648 until they are recombined into a single path 656 upon completing transit of the first EM embodiment 610.

In order to conduct solely the prototypical SOSCP, the eighth 644, ninth 652, and tenth 654 sectors are optional, since the prototypical SOSCP can be concluded once the electron has traversed the seventh sector 640. An alternative manner of conducting the prototypical SOSCP is with a second EM embodiment (not shown) in which the magnetic fields and extents of the eighth 644, ninth 652, and tenth 654 sectors are substituted for those of the first 614, second 622, third 624, fourth 626, fifth 628, and sixth 634 sectors. In this second EM embodiment, the phase aligning operation would be conducted in the equivalent of the ninth sector 652, which would then be the third sector of the second EM embodiment. It is also readily apparent that it is possible to intersperse various combinations of the sectors of the first EM embodiment 610, to produce further alternative EM embodiments, which can function in analogous manners to the first EM embodiment 610. The descriptions of the EM embodiments are not limiting in regard to their employment of magnetic fields of any magnitude or direction, nor in their employment of electric fields of any magnitude or direction, nor in their variations of the extents or order of employment of their respective sectors, providing these variations do not interfere with the EM embodiments' intended capabilities.

Superposition of States Preserving Protocols

A prototypical superposition of states preserving protocol (SOSC-PP) includes the five prototypical SOSCP core operations, which are referred to then as the initial five SOSC-PP core operations. For the prototypical SOSCP to become the prototypical SOSC-PP entails the addition of a further core operation:

6. A resurrecting operation that occurs after cessation of the prototypical SOSCP destructively interfering operation. The resurrecting operation reconfigures the components by undoing the eigenstate altering and phase aligning effects of the prototypical SOSCP core operations 2 and 3, respectively, and then reversing the separating effect of the eigenstate distinguishing operation to substantially replicate the significant aspects of the initial superposition of states of the entity which underwent the prototypical SOSCP.

The preserving property is achieved when the substantial replication of "the significant aspects of the initial superposition of states" is sufficient to enable the preserved superposition of states to be of significance following the above resurrecting operation.

Tactics for accomplishing the resurrecting operation will vary, depending at least in part on the individual circumstances of specific realizations of the prototypical SOSC-PP. For the focused intersection optical apparatus embodiment 100, the different approaches for conducting the conditionally responding operation are examples of the individual circumstances that affect how the resurrecting operation is conducted. A similar first optical resurrecting tactic is suitable for both the photo detector approach 210 and the scattering approach 310, while a second, related optical resurrecting tactic is suitable for the imperfect mirror approach 410. Although the resurrecting operation is not exclusively applicable to entities that were initially in a superposition of states and that whose superposition of states were not demolished during the prototypical SOSCP, it can be of prominent significance in relation to these entities that maintain at least a partial degree of superposition of states during the prototypical SOSCP. Accordingly, the optical resurrecting tactics specifically described herein are primarily designed to accommodate accomplishing the resurrecting operation with such entities.

The first optical resurrecting tactic addresses the situation wherein the horizontally and vertically polarized photon components continue along the paths 112 and 114, respectively, after passing through the interference zone 130. In this situation, the photon components have not undergone demolishing interactions with either the photon detector 212 in the photo detector approach 210, or the scattering element 312 in the scattering approach 310. The photon components continuing along the paths 112 and 114 are directed into uptake optical fibers H 216 and V 214, respectively. Photon components in the optical uptake fiber H 216 are directed through another half wave plate (not shown) that reverses the π/2 rotation of the polarization direction due to the half wave plate 120. This rotation of the polarization direction of the photon components in the uptake optical fiber H 216 from the vertical direction to the horizontal direction accomplishes the undoing of the eigenstate altering operation. The two photon components are subsequently directed along controlled paths which are eventually recombined into a single exit optical fiber (not shown). These controlled paths utilize the aforementioned phase shifters and/or path length modifications to undo the π phase shift between the components instituted during the prototypical SOSC-PP. The recombining of the components in the single exit optical fiber is effected so as to undo the separating effect of the eigenstate altering operation. The undoing of the separating effect can be by means of a birefringent crystal, a coinciding of the paths 112 and 114 guided by internal reflections of the uptake optical fibers H 216 and V 214, respectively, or other well known means. The result is a photon that substantially replicates the significant aspects of the initial superposition of linearly polarized states of the photon upon which the prototypical SOSC-PP was conducted.

The second optical resurrecting tactic is largely analogous to the first optical resurrecting tactic, varying mainly by the means in which the photon components are directed to the uptake optical fibers V 214 and H 216. In the imperfect mirror approach 410, photon components that exhibit destructive interference in the interference zone 130 will experience the imperfect mirror 412 akin to a complete mirror which lacks the gap 414. Hence, the photon components will undergo a relatively true reflection and can be directed to uptake optical fibers V 214 and H 216 following their reflection. With the imperfect mirror approach 410, the uptake optical fibers V 214 and H 216 will be disposed on the same side of the mirror 412 as are the optical fibers H 116 and V 118. The main restriction is that the mirror 412 needs to be angled so that the dispositions of the uptake optical fibers V 214 and H 216 do not interfere with the dispositions of the optical fibers H 116 and V 118. Among other ways, this can be accomplished by rotating the imperfect mirror about a rotational axis that corresponds to the intersection of the plane of FIG. 4 and the plane of the imperfect mirror 412. The uptake optical fibers V 214 and H 216 would then be disposed out of the plane of FIG. 4, but would otherwise be analogous to the uptake optical fibers V 214 and H 216 of the first optical resurrecting tactic.

A third optical resurrecting tactic would be employed to provide the capability of conducting the prototypical SOSC-PP with the pattern-based optical apparatus embodiment 510. The pattern-based optical apparatus embodiment 510 confirms the presence of the superposition of linearly polarized states by statistical analysis of photon counts registered from interactions with an ensemble of photons. The photons that are detected by the photon detectors 532 and 534 are not available for preservation. The strength of the statistical analysis improves with increasing numbers of photons in the ensemble, while one of the aims for optimal execution of the prototypical SOSCP is to minimize the number of photons that interact with the photon detectors 532 and 534 when the ensemble is comprised of photons in superpositions of linearly polarized states. Therefore, for an ensemble of photons in superpositions of linearly polarized states, a large majority of the photons do not interact with the photon detectors 532 and 534, and hence continue their progress past the detection plane 524. In this embodiment, however, once the photons have passed the emission plane 516, the paths of photon components that were originally in horizontal polarization states are not knowably discernable from the paths of photon components that were originally in vertical polarization states. As a result, the extent of the resurrecting operation that can be accomplished may be limited in this embodiment.

Once the photons have passed the detection plane 524, they can be collected and directed individually or as an ensemble. In one sense, the ensemble is chiefly preserved in that the majority of the ensemble continues its existence. Once the ensemble's original superposition of linearly polarized states has been confirmed, the remaining ensemble can be prepared in a new superposition of linearly polarized states, and though this new superposition of linearly polarized states will not coincide with the original superposition of linearly polarized states, it can be made to be not only confirmable, but even confirmable by the same embodiments that can confirm the original superposition of linearly polarized states. In this sense the ensemble's status of being composed of photons in superpositions of linearly polarized states can be preserved.

A first EM resurrecting tactic (not shown) can be enacted within the ninth sector 652 of the first EM embodiment 610. In order to accomplish the first EM resurrecting tactic, it is only necessary to undo (via any of a number of well known means) the phase aligning operation that was conducted in the fourth sector 626. Once the phase aligning operation has been undone, the spin-up component 618 and the spin-down component 620 are no longer π out of phase, and the eigenstate altering operation will generally not require undoing since it is usually a null operation. Hence, once the reversing of the eigenstate separating effect is enacted in the tenth sector 654, the significant aspects of the electron's original superposition of spin states have been substantially replicated.

Superposition of States Discerning Protocols

A prototypical superposition of states discerning protocol (SOSDP) is also comprised of the prototypical SOSCP core operations 1 through 4 described above (albeit with substitution of the term "SOSDP" for the term "SOSCP"), but rather than the prototypical SOSCP conditionally responding core operation 5, the prototypical SOSDP further includes:

5. A discerning operation that occurs during the prototypical SOSDP destructively interfering operation. The discerning operation enacts a selecting effect that both distinguishes whether the components exhibit evidence of destructive interference during the prototypical SOSDP destructively interfering operation, and produces outcomes that differ depending on the exhibition of evidence of destructive interference.

One principal distinction between the discerning operation of the prototypical SOSDP and the prototypical SOSCP conditionally responding operation of the prototypical SOSCP is that the discerning operation does not inherently provide confirming information about the entity's initial superposition of states. The prototypical SOSDP can become the prototypical SOSCP also, if a determination is made of which outcome resulted from the prototypical SOSDP discerning operation. Another principal distinction is that the prototypical SOSCP confirming operation does not inherently produce differing outcomes, one such instance being when the conditionally responding operation of the prototypical SOSCP is conducted in a delayed-choice manner. Nonetheless, any protocols' status as a confirming or discerning operation does not preclude its status as the other form of protocol, and the labeling applied to a particular protocol can be mostly indicative of its intended or eventual role.

The focused intersection optical apparatus embodiment 110, the pattern-based optical apparatus embodiment 510, and the first EM embodiment 610 are each capable of being adapted for conducting prototypical SOSDPs. Among the ways in which these embodiments can conduct prototypical SOSDPs are by conducting the aforementioned prototypical SOSCPs as delayed-choice protocols, wherein the prototypical SOSCPs' conditionally responding operations differentiate between outcomes, but these outcomes are not registered. The discerning operation can also be achieved by different outcomes of the discerning operation producing different physical effects, whether or not the resultant physical effect is ascertained.

In the first EM embodiment 610, for example, when the electron was not originally in the superposition of spin states, it will be directed out of the plane of FIG. 6 by the electric field $E_z$ 642 in the seventh sector 640. When the electron was originally in the superposition of spin states, its path will continue within the plane of FIG. 6. The discerning effect can be provided by differing effects being produced when the electron leaves the plane of FIG. 6 than are produced when the electron does not leave the plane of FIG. 6. It is notable that this discerning effect neither requires nor precludes registering which outcome results, although if the registering of the outcome does occur, then the protocol is also the prototypical SOSCP. One illustration of how the discerning effect can be utilized is by linking the different outcomes to another operation, such as a subsequent protocol, wherein the different outcomes of the prototypical SOSDP determine whether or not the subsequent protocol is conducted as a preserving protocol. In such a case, even though the discerning effect of the preceding SOSDP determined whether or not the subsequent protocol is a preserving protocol, the outcome of the subsequent protocol, by itself, will not reveal the outcome of the preceding SOSDP.

A prototypical superposition of states preserving protocol (SOSD-PP) includes the five prototypical SOSDP core operations, which are referred to then as the initial five SOSD-PP core operations. For the prototypical SOSDP to become the prototypical SOSD-PP entails the addition of a further core operation:

6. A resurrecting operation that occurs after cessation of the prototypical SOSD-PP destructively interfering operation. The resurrecting operation reconfigures the components by undoing the eigenstate altering and phase aligning effects of the prototypical SOSD-PP core operations 2 and 3, respectively, and then reversing the separating effect of the eigenstate distinguishing operation to substantially replicate the significant aspects of the initial superposition of states of the entity which underwent the prototypical SOSD-PP.

The preserving property is achieved when the substantial replication of the significant aspects of the initial superposition of states is sufficient to enable the preserved superposition of states to be of significance following the SOSD-PP resurrecting operation. Tactics for accomplishing the resurrecting operation of the prototypical SOSD-PP are often similar to those employed for accomplishing the resurrecting operation of the prototypical SOSC-PP, and will vary depending on how the prototypical SOSD-PP is realized.

Entanglement Confirming and/or Discerning Protocols

The above protocols can generally also provide further capabilities when utilized with at least one entity that is entangled with at least one other entity. Given sufficient knowledge about the entangled entities to establish adequate constraints on the possible shared superpositions of states, it is possible to apply an appropriate SOSCP (or SOSDP) to confirm (or discern) whether or not the possibly entangled entities share a superposition of states. The superposition of states confirmation (or discernment) thus garnered, in conjunction with knowledge of the possible entanglements the entities could share, enables confirmation (or discernment) of the entities' entanglement. The ability to confirm (or discern) that multiple entities are entangled by interacting with at least a first of, but less than all of, the entangled entities enables confirming (or discerning) that at least a second entity, which was not directly interacted with, is entangled as well. Confirming (or discerning) that the second entity is entangled is also equivalent to confirming (or discerning) that the second entity is in a superposition of states without directly interacting with the second entity. These entanglement confirming (or discerning) capabilities, as well as the confirming (or discerning) of an entity's entanglement or superposition of states without directly interacting with that entity, can clearly also be realized in preserving manners, by including the suitable SOSC-PP (or SOSD-PP) resurrecting operations.

The various confirming and discerning protocols can be combined in differing permutations. Individual protocols may be alterable or not, and can be either confirming or discerning, or both as well. Factors that can influence protocol attributes include differences in entity natures, differences in the superposition of states and/or entanglements of entities, as well as differences in the operations and/or results of other protocols. Individual protocols can also be both confirming and discerning with variations in a given protocol's confirming and/or discerning status also being influenced by factors that can include differences in entity natures, differences in the superpositions of states and/or entanglements of entities, as well as differences in the operations and/or results of other protocols. In principle, neither the number of entities nor the variety of confirming and/or discerning protocols that can be executed upon an entity, either singly or in combination, are limited. Furthermore, the diversity of superpositions of states in which entities can be entangled and the range in variations of response by SOSCPs and/or SOSDPs to supplementary factors (such as differences in the nature of the entity, differences in the superposition of states and/or entanglements of the entity, as well as differences in the operations and/or results of other protocols) are not, in principle, limited either.

Applications

The aforementioned protocols, combinations of protocols, and variations thereof, are capable of being utilized for quantum communication, quantum cryptography, and quantum computation purposes. One such utilization is a first quantum communication application that is realizable by executing a signaling action with an entanglement confirming protocol. In the first quantum communication application, at least two entities that are initially entangled are distributed to first and second parties. The first party is a signal sender and the second party is a signal receiver. The sender chooses whether or not to demolish the entanglement of the entities, and the receiver executes an entanglement confirming protocol. Among the ways the sender can transmit a signal to the receiver is by means of a prearranged interpretation in which, for example, the presence of entanglement signals a single-bit value of "1", and the absence of entanglement signals a single-bit value of "0". The sender can transmit a flow of information by utilizing a series of entities, analogously to conventional digital systems' means of relaying information encoded in series of 1's and 0's.

A second quantum communication application is capable of transmitting more complex sets of information than a single bit per entangled entity. The operation of the second quantum communication application can be illustrated by considering an example in a three dimensional Hilbert space with dimensions A, B, and C. It is given that there are two possible values, + (plus) and − (minus), for each eigenstate of the three dimensions; that two entangled entities, designated 1 and 2, are employed; and that a sender interacts with entity 1 while a receiver interacts with entity 2. It is further given that these entities are initially entangled in the state:

$$\Psi_i = 1/\sqrt{2}[|A(+)B(-)C(-)\rangle_1|A(-)B(+)C(+)\rangle_2 + |A(-)B(+)C(+)\rangle_1|A(+)B(-)C(-)\rangle_2]$$

The sender transmits information by either preserving or demolishing at least one of the $\Psi_i$ superposition of states, which also inherently involves either demolishing or preserving at least one of the $\Psi_i$ entanglements. The receiver executes confirming or discerning protocols in the dimensions A, B, and C to receive the signal from the sender. If the sender demolishes the A-dimension entanglement, such as by measuring for an eigenstate of the A-dimension, but not the entanglements in the other two dimensions, the receiver would then be then left with the wave function:

$$\Psi_f = 1/\sqrt{2}[|B(-)C(-)\rangle_1|B(+)C(+)\rangle_2 + |B(+)C(+)\rangle_1|B(-)C(-)\rangle_2]|A(\pm)\rangle_1$$

The receiver would find that the superposition of states is absent in the A dimension, but present in the other two. Since the superposition of states in any of the three dimensions could have been demolished, either singly or in combination, eight differing sets of results can be transmitted by the single entity entangled in the state $\Psi_i$.

More complex sets of information can be transmitted per entity by incorporating protocols which do not just confirm or discern the presence of entanglement, but that can also confirm or discern the degree of entanglement. There is a substantial body of work on quantifying degrees of entanglement, including means of using degree of entanglement quantification for quantum communication, quantum cryptography, and quantum computation applications. By confirming or discerning between varying degrees of entanglement, protocols according to the present invention can utilize both increased complexities of information and greater varieties of operation. Even the employment of a single entity with a single Hilbert space dimension is thus capable of a multiplicity of functions, while the employment of multiple entities or entities with multidimensional Hilbert spaces can provide still greater functional capacities.

A first quantum computation application is arranged similarly to the second communication application, with noteworthy modifications including replacing the sender and receiver of the second communication application with first and second information processing operations, respectively. The other given aspects of the second communication application are also applicable for an illustrative example of the first computation application. Among other functions, the first quantum computation application can perform as any of the well-known basic logic gates: AND, OR, XOR, NOT, NAND, NOR, and XNOR; from which more complex computations can be built. In the first information processing operation, decisions to preserve or demolish the A and B dimensions' superpositions of states can serve as inputs for the basic logic gates. (The NOT logic gate only requires a single input which can be achieved by using either the A or the B dimensions' superpositions of states as an input.) The second information processing operation confirms or discerns the A and/or B dimensions' superpositions of states, each in either a preserving or demolishing manner. The second information processing operation then confirms or discerns the C dimension's superposition of states in either a preserving or demolishing manner. The selection between preserving or demolishing the C dimension's superposition of states can depend on both the results of the confirming or discerning of the A and/or B dimensions' superpositions of states, and the type of logic gate in which the first quantum computation application is configured to perform.

Other quantum computation applications of the present invention can provide additional capabilities, including more complex functions than the basic logic gates. These other quantum computation applications can also utilize the first quantum computation application's second information processor option to preserve or demolish the A and/or B dimensions' superpositions of states (when not yet demolished by the first information processing operation). Rather than just a single output bit per two input bits (as is produced by the standard logic gates), the present invention's quantum computation applications is capable of producing greater ratios of output bits to input bits. These ratios are capable of being great enough that the number of output bits can exceed the number of input bits. The capability of producing increased ratios of output to input bits enables the realization of computational networks with greater degrees of complexity per number of information processing operations than is available with conventional ratios of output to input bits. The greater complexity is available because a single computation according to the present invention can produce multiple different outputs which can be differentially input to other computations. While each increased output bit ratio computation provides the capability of an incremental gain in complexity for computational network designs; exponential gains in complexity can be realized by utilizing multiple layers of increased output bit ratio computations.

Incorporating protocols capable of responding to degrees of entanglement provides still greater information processing capacities for quantum computation applications according to the present invention. These degree of entanglement responsive protocols can also increase both the complexities and varieties of operations available to the quantum computation applications. Degree of entanglement responding protocols can enable a single entity with a single Hilbert space dimension to perform a multiplicity of computational functions, and can further enable multiple single-dimensional entities and/or entities with multidimensional Hilbert spaces to provide still greater functional capacities.

Confirming and/or discerning protocols according to the present invention can provide substantial advantages for quantum cryptography purposes as well. Generally, cryptography approaches depend on the strength of their encrypting algorithms and carefully controlled access to encryption keys. These approaches do not usually consider it possible to guarantee that access to the encrypted information itself can be totally controlled, or that it can be ascertained for certain whether or not the encrypted information was accessed prior to its delivery to the intended recipient. By contrast, a first type of quantum cryptography application according to the present invention can both increase confidence that access to the encrypted information is suitably restricted, and add assurance regarding whether or not the encrypted information was improperly accessed.

In the first type of quantum cryptography application, the encrypted information can be encoded in a data quantum state $|D_e(+/-)\rangle$ that is in a superposition of states with a control quantum state $|c_e(+/-)\rangle$ to produce a first encryption type quantum state:

$$105_1{}^{en} = 1/\sqrt{2}[|c_e(+)\rangle|D_e(-)\rangle + |c_e(-)\rangle|D_e(+)\rangle]$$

Where the (+/−) refers to the generic alternative values of a quantum variable, that can be any variable or combination of variables capable of assuming at least two different values, and is not limited to variables with discrete values nor to variables with only two values nor to variables in a Hilbert space of only a single dimension. An example of a physical means of realizing $\Psi_1{}^{en}$ is with photons serving as the entities in which the quantum states $|D_e(+/-)\rangle$ and $|c_e(+/-)\rangle$ are encoded. The (+/−) variable can be the polarization direction of the photons, wherein the two values can indicate orthogonal polarization directions. The encrypted information can be stored in frequency or amplitude modulations of the $|D_e(+/-)\rangle$ photon. Utilization of the $|c_e(+/-)\rangle$ photon to encrypt information is also possible.

The first type of quantum cryptography applications utilize the confirming and discerning protocols to cause the very act of accessing encrypted information for decryption purposes to leave evidence that the accessing has occurred. In order to decrypt an encrypted block of data $|D_e(+/-)\rangle$ the encrypted data must be processed in a decrypting operation. For that decrypting operation to occur, definitive knowledge of the still encrypted data is necessary. The process of gaining definitive knowledge of the still encrypted data entails demolishing the $\Psi_1{}^{en}$ superposition of states. The intended recipient of the encrypted information initially executes a superposition of states confirming or discerning protocol to determine whether or not the information has been previously accessed. If the superposition of states is intact, the encrypted information has not been previously accessed, and hence could not have been decrypted. If the superposition of states is not intact, the recipient knows that the information could have been accessed and hence could have been decrypted by an unintended recipient. By confirming or discerning whether or not the superposition of states of $\Psi_1{}^{en}$ is intact, the first type of quantum cryptography applications both enables the security of encrypted information to be established, and detects if the security of that encrypted information has been potentially compromised. The first type of quantum cryptography applications are not limited to the particular details of the $\Psi_1{}^{en}$ superposition of polarization states example described above. The cardinal features of the first type of quantum cryptography applications are an encrypting of information in at least one superposition of states, and a utilization of the confirming, discerning, and/or preserving protocols to detect and/or inspect the security of the encrypted information within the superposition(s) of states.

Specialized Configuration Class of Embodiments

The specialized configuration class of embodiments of the present invention incorporate specific configurations adapted for definitively confirming the presence of corresponding specific superpositions of states. An instructive optical representative example of the manner of operation of the specialized configuration class utilizes photons that are in a superposition of orthogonally polarized states. Generally, for simplicity of discussion, such polarization states are considered to be linearly polarized in either the horizontal or vertical directions. Photons which are polarized in the vertical direction do not exhibit interference effects with photons of the same wavelength that are polarized in the horizontal direction. As demonstrated in the optical embodiments previously described, utilization of the polarization directions of the component states to accomplish the confirming, discerning, and/or preserving protocols initially involves performing the eigenstate distinguishing operation to separate between the horizontal and the vertical component eigenstates. This separation is commonly accomplished with a birefringent crystal that has its optical axes arranged in a suitable alignment. The suitability of this alignment is determined in part by the orientation of the crystal relative to the horizontal and vertical polarization directions. If these polarization directions are rotated about the photons' axis of propagation by an angle $\sigma$ prior to encountering the crystal, the crystal will no longer reliably distinguish between the original horizontal and vertical polarization directions. For the confirming, discerning, and/or preserving protocols to operate as envisioned, the crystal must also be rotated by the angle $\sigma$. Since the angle $\sigma$ can assume a virtually unlimited number of values, there are a virtually unlimited number of specialized configurations available even for just the optical representative example. Each specific value of $\sigma$ corresponds to an individual specialized configuration.

If the confirming, discerning, and/or preserving protocols of the optical representative example of the specialized configuration class of embodiments are executed without the birefringent crystal aligned so as to precisely coincide with the specific angle $\sigma$ that the photons' polarization directions are rotated through, their results will not accurately reflect the presence or absence of the photons' superpositions of states. A cryptography first group of specialized configuration applications are readily constructed in accordance with the optical representative example by restricting knowledge of the specific $\sigma$ that the photons' polarization directions are rotated through. In a first embodiment of the cryptography first group of specialized configuration applications, the information in a transmitted signal is represented by a sequence of superpositions of states being either present or absent. Without knowledge of the correct $\sigma$, the sequence of present or absent superpositions of states registered by an unauthorized accesser would have a randomized relationship to the actual sequence, and would hence be ineffectual for interpreting the information in the signal.

In a second embodiment of the cryptography first group of specialized configuration applications, access to the encrypted information can be made conditional upon possession of knowledge of the specific configuration that corresponds to the specific superposition of states in which the encrypted information is encoded. For the second embodiment of the cryptography first group to be achieved with the optical representative example, access to the encrypted information would be conditional on specific knowledge of the precise $\sigma$ that the photons' polarization directions have been rotated through. The second embodiment of the cryptography first group can produce multiple specific configurations by a variety of means that include incorporating superpositions of states in multiple dimensions and incorporating multiple entities in separate specific superpositions of states. For the optical representative example of the second embodiment of the cryptography first group to incorporate multiple specific configurations, the photons can be rotated by a sequence of separate $\sigma$'s, or the information can be encoded in a series of photons, each of which have been rotated through a different $\sigma$.

The features and variations of the quantum cryptography applications of the specialized configuration class of embodiments are also utilizable for quantum communication and quantum computation applications of the specialized configuration class of embodiments. A communication second group of specialized configuration applications can communicate multiple bits of information with a single entity by, for example, successively executing a series of superposition of states discerning protocols on that entity. Each successive protocol can discern whether or not the entity is in a specific superposition of states, such as a specific σ in the optical representative example. If a third out of ten successive protocols discerned that the entity is in a corresponding third specific superposition of states, a value of 3 from out of 10 possible values is thereby communicated. In a similar fashion, embodiments of a computational third group of specialized configuration applications can differentially execute multiple information processing operations with a single entity. Referring again to the optical representative example, successive protocols corresponding to separate specific values of σ can be combined with the previously described embodiments capable of functioning as basic logic gates. One manner of combining these is for successive discerning protocols that correspond to separate specific values of σ to each be individually linked with a separate logic gate. The selection of which σ that the input photon is rotated through and the selection of logic gate that is linked with the corresponding σ protocol combine to determine the logic gate operation executed for a particular input photon.

Another important feature of the present invention's computational applications is the capability of providing multiple types of logic gate functions with the same individual processor. Conventional field effect transistors are only capable of achieving a single type of logic gate function. Additionally, the present invention's processor embodiments can be switched between types of logic gate functions during operation, or even after ceasing direct physical interaction with the entity being processed, by utilizing a delayed-choice protocol. Still further, the present invention's processor embodiments can simultaneously function as more than one type of logic gate, such as by the above described means of alternative configurations linked to alternative values of σ and said alternative configurations functioning as differing logic gates.

A computational fourth group of embodiments of the specialized configuration class of embodiments of the present invention utilize the configuration of the embodiment as a control factor for an information processing operation such as a logic gate. As described previously, the configuration of a first processor can be either altered or not depending on whether or not the entity the first processor interacted with was in a superposition of states. An entanglement linkage first embodiment of the computational fourth group can utilize the attributes of the optical representative example to alter the configurations. The configuration altering attribute is the specific value of σ to which the birefringent crystal is aligned. The means of altering σ can be an inherent aspect of the first information processor's operation, or a suitable extraneous means such as an electromechanical relay that alters σ in accordance with the first information processor's result. Given first and second entities that are entangled in at least one superposition of states, actions to preserve or demolish the superposition of states of a second entity can thereby remotely realize controlling effects upon the first entity's processor. A second entity processor, by either preserving or demolishing the entities' entanglement, can utilize this remote effect to produce a linkage to the first entity processor. The second entity processor's action can thereby serve as a controlling factor of the result of the first processor's operation. This linkage can function as a computational process, wherein the initial presence or absence of specific entangled superpositions of states are input(s), actions of the second processor are control factors, and the subsequent presence or absence of specific entangled superpositions of states are among the output(s). Moreover, the residual configuration that the first processor is left in following the information processing operation can provide another supplementary output.

The entanglement linkage first embodiment of the computational fourth group is further capable of performing as a selectable means for realizing auxiliary functions. In such a case, the residual configuration of the first entity processor can be utilized to selectively execute other information processing operations. These other information processing operations can be executed both individually and in selected combinations. If the first entity processor is comprised of the optical representative example, this can be achieved by selecting to shift the optical representative example from an initial $\sigma_1$ configuration to a residual $\sigma_2$ configuration, wherein the $\sigma_1$ and $\sigma_2$ configurations correspond to first and second specific superpositions of states, respectively. The residual $\sigma_2$ configuration of the optical representative example of the entanglement linkage first embodiment can be arranged to bring about other information processing operations upon responding to the presence of the second superposition of states. The interaction of the first entity processor with the first entity can thus be coupled with a subsequent interaction with a third entity that is in the second superposition of states. The first entity processor can then respond to the third entity's superposition of states, after being switched to the residual $\sigma_2$ configuration by the interaction with the first entity. The entanglement influenced interaction between the first entity and the first entity processor can then both effect that initial information processing operation as well as subsequent information processing operations. Back-linking controlling effects between the first entity processor and the second entity processor is an inherent capability of the entanglement linkage first embodiment of the computational fourth group. Rather than functioning only as an input source for the operations of the first entity processor, the second entity processor can also be configured to alter its configuration in response to the presence or absence of the superposition of states of the second entity. In such a case, the second entity processor is also capable of providing the functionality of this embodiment's first entity processor.

Selective Mode Class of Embodiments

The selective mode class of embodiments of the present invention are distinguished by their protocols' abilities to selectively function in either preserving or demolishing modes. Among the distinctive features of the selective mode class of embodiments are their abilities to execute SOSCPs and SOSDPs in either preserving or demolishing modes. The selective mode feature enables the same realization of the selective mode class of embodiments to selectively switch between modes. A progression property of the selective mode feature provides an option of being capable of performing the preserving/demolishing either pre- or post-responding/discerning (i.e. before or after, respectively, the conditionally responding or discerning operation), or both. Depending on the other possible circumstances involved, such as interconnections with other protocols and the superposition of states status of the entity interacted with, the progression option chosen can provide additional functional capabilities. In certain circumstances, the choice of progression option may prove not to be significant, such as when the entity is not in a superposition of states prior to its interaction with the protocol.

An example of the pre-responding option of the progression property with the first EM embodiment 610, is providing the capability of demolishing the superposition of spin states in the fourth sector 626 (such as by determining the spin of the electron by measuring whether it is taking path 628 or path 630). An example of the post-responding option is realized by providing the capability of demolishing the superposition of spin states in the ninth sector 652 (such as by determining the spin of the electron by measuring whether it is taking path 646 or path 648). An example of the dual pre- and post-responding option is realized by providing the capability of demolishing the superposition of spin states in both the fourth sector 626 and the ninth sector 652.

A first means of achieving the selective mode feature with the focused intersection optical apparatus embodiment 100 is further illustrative of the selective mode class of embodiments. As described previously, the photo detector approach 210, the scattering approach 310, and the imperfect mirror approach 410 for conducting the conditionally responding operation are all capable of being conducted in either a preserving or a demolishing mode. Implementing the selective mode feature as a pre-responding/discerning option is readily achievable with the selectable photon counters 122 and 124. Implementing the selective mode feature as a post-responding/discerning option can be achieved by disposing another pair of selectable photon counters 122 and 124 (not shown) along the paths 214 and 216, respectively, after cessation of the destructively interfering operation and before the resurrecting operation. Implementing both pre- and post-responding/discerning can hence be achieved by disposing selectable photon counters in both of these manners. It is important to note that the previously described caveat regarding the selectable photon counters being unable to register a photon, even in principle, unless they are selected to do so remains necessary for the same realization to be capable of performing in both a preserving and a demolishing mode.

It may be desired that protocols according to the present invention operate in a preserving mode, but that the continued existence of the entity is unneeded or even unwanted following its interaction with the protocol. It is possible that an unintended post-protocol interaction could demolish an entity's superposition of states and thereby change the responding/discerning outcome of the protocol in a form of a delayed-choice effect. In the example of the focused intersection optical apparatus embodiment 100, as long as the photon's superposition of linearly polarized states is intact a demolishing interaction can occur which may alter the outcome of a confirming/discerning and preserving protocol. Since unintended environmental decoherence can be a pervasive issue when conducting quantum operations, it is desirable to be capable of avoiding this possibility. One means of avoiding the post-responding/discerning outcome alteration is to conduct momentum measurements on the photon components following cessation of the conditionally responding/discerning operation. It is a well known consequence of the Heisenberg principle that an exacting measurement of a photon's momentum precludes the determination of any position information about that photon. If the photon components' momentums are determined as a sum after the conditionally responding/discerning operations, and it is not possible to determine which component contributed what amount to that momentum measurement, then the position information, i.e. the which-path information, is destroyed. The photon's superposition of linearly polarized states status will be thereby preserved even though the photon itself was not. This process can be readily employed as a selectable alternative, in the imperfect mirror approach 410 for example, by selectively controlling the angle of inclination of the plane of the imperfect mirror 410 to the plane of FIG. 4, whereby at one angle of inclination the photon components are reflected towards the above described momentum measurements, and at another angle they are not. The selective control of the angle of inclination can be a predetermined choice or alterable in response to other events and inputs such as the outcomes of other protocols.

When a delayed-choice effect is potentially applicable, the post-responding/discerning option can alter the conditionally responding/discerning operation's outcome even after the entity has left the interference zone 130. In this situation, the outcome of the protocol, by itself, may not be different for the pre- and post-responding/discerning options. However, when the protocol at hand is interconnected with other phenomena such as, but not limited to, other protocols, the overall outcome can be different for the pre- vs. post-responding/discerning options. This potential difference in overall outcomes can provide additional functional capabilities that are realized by various embodiments of the present invention including a subsequently described interrelated protocols embodiment 710.

A second means of implementing the selective mode feature with the first EM embodiment 610 further illustrates of the selective mode class. The second means of implementing the selective mode feature in the fourth sector 626, the ninth sector 652, or both, utilizes means of discerning whether the electron is taking path 628 or 630, or discerning whether the electron is taking path 646 or 648, respectively, or both. The discerning means and the means for switching between preserving and demolishing modes are both achievable by a number of well known EM techniques.

The selective mode feature expands the present invention's range of functional capacities, both by operating independently as a supplementary capability, and by operating in concert with other features as an augmentation to their capabilities. A majority of the embodiments of the present invention can potentially utilize the selective mode feature to perform or enhance their functions, including embodiments adapted for quantum communication, quantum computation, and quantum cryptography applications. The selective mode feature can also be utilized with embodiments adapted for further applications including utilizations for quantum teleportation, quantum-enhanced positioning, improved clock synchronization, high precision measurements, and improved frequency standards.

Protocol Sequences

A pair of criteria can be used to classify a number of the additional capacities garnered by employing sequences of entities in (potential) superpositions of states. A first such sequential capacity classification criteria distinguishes between capacities that utilize the (potential) entanglement properties of these entity sequences and those that do not. A second sequential capacity classification criteria distinguishes between those capacities that are responsive to a characteristic of the order of interaction with the entities in a sequence and those that are responsive to another characteristic of the manner of interaction with the entities in a sequence, such as a characteristic that relates to time intervals between interactions.

Among the advantages of the sequential capacities that utilize entanglement properties are increases in the capabilities of the previously described quantum communication, computation, and cryptography embodiments. Among the advantages of the sequential capacities that do not utilize entanglement properties are reduced complications involved in maintaining just the (potential) superposition of states of each entity in the sequence, as opposed to maintaining the (potential) superposition of states of at least two entangled entities for each entity in the sequence. An example of the advantages of sequential capacities that are responsive to the order of interaction are the capability of linking the operation of a second protocol acting on a second entity and a fifth protocol acting on a fifth entity without concern for the relative time intervals between the interactions. Among the advantages of sequential capacities that are responsive to other manner of interaction characteristics is the capability of including functions that relate to interaction patterns, such as responding to the potential superpositions of states of entities whose interaction junctures are spaced at regular time intervals.

One example of such an other interaction pattern characteristic sequential capacity involves a sequence of pairs of entangled entities in which a first communicator interacts with one of each pair and a second communicator interacts with the other of each pair. The second communicator can receive a signal from the first communicator by confirming whether or not the status of the superposition of states of a present entity is the same status as that of a previous entity that was interacted with ten seconds earlier. The first communicator sends the signal by either preserving or demolishing the superposition of states of a first counterpart entity that is entangled with a second counterpart entity that the second communicator will interact with at a known time. Alternatively, the signal can indicate the answer to a prearranged enquiry that is known to both communicators. This alternative allows a number of enquiries to be answered during overlapping time spans by prearranging that a first enquiry is answered at a first time, a second is answered at a second time, and so on. The information that can be transmitted in this way is unlimited in principle, as discussed earlier, because the presence or absence of any particular superposition of states can serve as a generic bit of encoded information.

Sequential interactions can be utilized for other embodiments of the present invention, in addition to embodiments with communication applications. The form of operation or result of one protocol in a sequence can be utilized to alter the form of operation of a subsequent protocol in the sequence. Examples of this form of operation alteration include shifting a subsequent protocol from a preserving to a demolishing mode, or altering the specific configuration of a subsequent protocol so that it responds to a different superposition of states than it responded to before it was altered. Utilizing sequentially dependent protocols in combination with sequences of entangled entities provides capabilities of interconnecting multiple associations between protocols to thereby produce adaptable protocol networks.

The recurrence class of embodiments of the present invention are realizable by successive interactions of responding/discerning and preserving protocols with an entity. The specific order of responding or discerning protocols can be uniformly of either type or interspersed types; as well as a static or dynamic order. The successive protocol interaction can be comprised of differing apparatuses executing differing protocols, or can be comprised of repeated interactions with the same apparatus that either repeatedly executes the same protocol or sequentially executes differing protocols, such as by operating as one of the above described configuration altering embodiments.

An alternative approach to realizing the recurrence class of embodiments is achievable with the pattern-based optical apparatus embodiment 510. The interference pattern expressed by the ensemble of photons in the superposition of linearly polarized states extends throughout the region to the right (as depicted in FIG. 6) of the emission plane 516. The disposition of the detection plane 524 in FIG. 6 is selected to maximize the discrimination efficiency of the pattern-based optical apparatus embodiment 510, but an essentially unlimited number of alternative dispositions for the detection plane 524 are also capable of enabling the pattern-based optical apparatus embodiment 510 to perform. Among the possible alternative dispositions for the detection plane 524 are planes parallel to the detection plane 524 at distances greater than L from the emission plane 516. For simplicity of illustration, but without loss of generality, the description here will focus on such planes spaced at distances equal to integral multiples of L from the emission plane 516, and will be referred to as the 2L plane, 3L plane, and so on. The plurality of 2L, 3L, etc. planes include similar photon detection systems as described for the detection plane 524 in the pattern-based optical apparatus embodiment 510, although the number and placements of the photon detectors 532 and 534 can differ from their arrangement in the detection plane 524 in order to maximize efficiency for that particular plane. This alternative approach to the recurrence class of embodiments involves each successive 2L, 3L, etc. plane operating as an executor of a separate, successive protocol. The recurrence of protocols thus occurs by the ensemble of photons being responded to by successively determining the results of each plane in order of increasing distance from the emission plane 516.

Protocol Networks

The delayed-choice phenomena can be utilized by the protocols described herein when that protocol is at least selectively capable of operating in a preserving manner and when at least one superposition of states which the protocol interacts with is intact. The capability of selecting post-interaction whether or not protocols act in preserving manners allows the effects of multiple protocols to be jointly enacted, even where the effect of one protocol is the cause of another. In principle, there in no limit to the number of protocols which can be jointly enacted in this way. A chain of protocols that are connected in cause and effect relationships can be simultaneously executed, with the time required for their execution being only the period necessary for the entities that the protocols interact with to pass among the protocols. This period of time required for passage among the protocols may even be completed prior to initiating the executions of the protocol chain. Because a superposition of states that is not demolished in the execution of one protocol is capable of being demolished in a subsequent protocol which would thereby alter the entity that the earlier protocol interacted with from an intact superposition of states to a demolished superposition of states, the potential complexity of associations between protocols provided by the present invention are not limited by conventional networks' one-way traffic constraints.

The interrelated protocols embodiment 710 schematically depicted in a perspective view in FIG. 7 demonstrates a sample collection of the means in which various combinations of protocols are able to provide the protocol networks' capabilities. The particular means that comprise the interrelated protocols embodiment 710 are merely a representative selection of means with which the present invention can provide the protocol networks' capabilities, and are not limiting of the overall variety of available means. A pair of modified versions of the focused intersection optical apparatus embodiment 100 are among the components that comprise the interrelated protocols embodiment 710. These modifications to the focused intersection optical apparatus embodiment 100 may involve substituting for and/or excluding at least one of the selectable photon counters 122 and 124, utilizing at least one alternative means for achieving the conditionally responding or discerning operations, and/or interrelating at least one of any remaining photon counters or their substitutes with each other and/or with at least one of any conditionally responding or discerning means employed.

In FIG. 7, components of the modified focused intersection optical apparatuses are referenced by the same part number as indicates the same component of the focused intersection optical apparatus embodiment 100 in FIG. 1 (except for an ending letter in FIG. 7 which distinguishes the components of one of the pair of modified focused intersection optical apparatuses from the components of the other). A first modified focused intersection optical apparatus 712 is disposed in FIG. 7 above a second modified focused intersection optical apparatus 714. Like numbered components of the pair of modified focused intersection optical apparatus embodiments 100 are distinguished from each other by ending in a "F" if indicating a component of the first modified focused intersection optical apparatus 712, and ending in a "S" if indicating a component of the second modified focused intersection optical apparatus 714. Signal photons traverse through both the first modified focused intersection optical apparatus 712 and the second modified focused intersection optical apparatus 714 from left to right, as shown in FIG. 7.

The interrelated protocols embodiment 710 utilizes first and second optical Kerr media elements 716 and 718, respectively, as alternative means of achieving the conditionally responding operations. The employment of optical Kerr medias are well-known techniques for responding to the presence of a photon without destroying that photon. In general, optical Kerr medias can induce a change in the phase of a probe entity passing through the optical Kerr media if a signal photon is present in the optical Kerr media at the same time. The presence of the signal photon in the optical Kerr media can then be responded to by determining if the phase of the probe entity changed when passing through the optical Kerr media. A variety of different probe entities can be utilized, depending on the objectives and circumstances of particular realizations of the interrelated protocols embodiment 710. The available probe entities include, but are not limited to, atoms, molecules, accumulations of matter, and individual particles. The utilization of photons as the probe entities in the interrelated protocols embodiment 710 also provides a demonstration of the general means that can be adapted, with the appropriate modifications, for achieving the capabilities of the interrelated protocols embodiment 710 with alternative probe entities as well.

Directions and relative positions of the components of the interrelated protocols embodiment 710 are described in reference to the Cartesian coordinate axes 720. The x-direction is within the plane of FIG. 7, along the horizontal of FIG. 7, with the positive x-direction being to the right as depicted in FIG. 7. The y-direction is within the plane of FIG. 7, along the vertical of FIG. 7, with the positive y-direction being upward as depicted in FIG. 7. The z-direction is normal to the plane of FIG. 7, with the positive z-direction being towards the viewer as depicted in FIG. 7.

The probe photons that traverse the first optical Kerr media element 716 (first probe photons) move in the negative y-direction along the path indicated by arrow 722, and the probe photons that traverse the second optical Kerr media element 718 (second probe photons) move in the negative y-direction along the path indicated by arrow 724. The cross-section, normal to arrow 722, of the first optical Kerr media element 716 when it crosses the region of intersection 128F is sufficiently small so that it passes entirely within the interference zone 130F. The first probe photons' passages through the first optical Kerr media element 716, and the signal photons' horizontally and vertically polarized components 112F and 114F passage through the first modified focused intersection optical apparatus 712 are arranged so that they traverse the interference zone 130F concurrently. Consequently, the change in phase of the first probe photons when they traverse the interference zone 130F differs depending on the signal photon components 112F and 114F degree of destructive interference when they traverse the interference zone 130F. Similar arrangements and relations as these also apply to the second modified focused intersection optical apparatus 714 and the signal photon components 112S and 114S; to the second optical Kerr media element 718 and the second probe photons; as well as to the region of intersection 128S where the second modified focused intersection optical apparatus 714 and the second optical Kerr media element 718 cross.

The interaction of the first probe photons and the first optical Kerr media element 716 with the second modified focused intersection optical apparatus 714, and/or the interaction of the second probe photons and the second optical Kerr media element 718 with the first modified focused intersection optical apparatus 712 can produce the interrelating of the protocols. In FIG. 7, the first optical Kerr media element 716 is depicted as intersecting the optical fiber V 118S, while the second optical Kerr media element 718 is depicted as intersecting the uptake optical fiber 216F. This particular pair of intersections disposition is an illustration of one of the various ways in which the protocols can be interrelated. Alternative interrelated protocols embodiments with other permutations of the first optical Kerr media element 716 and/or second optical Kerr media element 718 intersecting with one or more of the optical fibers H 116F, V 118F, H 116S, and V 118S, as well as with one or more of the uptake optical fibers 214F, 216F, 214S, and 216S can also serve to provide the desired capabilities. It is readily apparent that varying capabilities are made available by the varying permutations employed by differing realizations of the interrelated protocols embodiment 710.

For the particular interrelated protocols embodiment 710 permutation depicted in FIG. 7, the second optical Kerr media element 718 intersects with the uptake optical fiber 216F in an optical fiber crossing region 726; and the first optical Kerr media element 716 intersects with the optical fiber V 118S in an optical fiber crossing region 728. The disposition of the optical fiber crossing region 728 is essentially comparable to that of the optical fiber crossing region 726. An expanded view of the optical fiber crossing region 726 (which also can serve to illustrate the optical fiber crossing region 728) is schematically depicted in FIG. 9. An optional linking agent 730 provides the capability of interrelating responses to the first probe photons with responses to the second probe photons, and further enables differential control of the responses to either or both the first and second probe photons. The linking agent 730 can enable the potential changes in phase of either or both of the first and second probe photons to be responded to separately or in combination. When responding to the potential phase changes in combination, the linking agent 730 can also provide the capabilities of responding to whether one or both of the Kerr medias' probe photons underwent changes in phase when crossing either interference zone 130F or 130S; as well as responding to whether only one, but not which one, of the Kerr medias' probe photons underwent a change in phase. In fact, the very uncertainty as to which Kerr medias' probe photons underwent a change in phase can provide additional capabilities.

In the description of FIG. 8, the parts will be described in reference to the region of intersection 128F initially, with the alternative part descriptions that reference the region of intersection 128S following in parentheses where applicable. FIG. 8 illustrates an expanded perspective view of the region of intersection 128F (128S) of FIG. 7. An optical Kerr media section 810 of the first (second) optical Kerr media element 716 (718) passes through the region of intersection 128F (128S). The optical Kerr media section 810 is shown as having a four-sided cross-section for illustrative purposes only, and can be comprised of any suitable physical form capable of providing the desired capabilities. The four sided cross-section is utilized here because crystals are a well-known type of optical Kerr medias. The optical Kerr media section 810, in passing through the region of intersection 128F (128S), is disposed entirely within the confines of the interference zone 130F (130S) when it crosses the intersection of the paths of the horizontally and vertically polarized signal photon components 112F (112S) and 114F (114S), respectively. The path of the vertically polarized signal photon component 114F (114S) enters the optical Kerr media section 810 through a left-front face 812, and exits through a right-rear face (not shown), while the horizontally polarized signal photon component 112F (112S) enters the optical Kerr media section 810 through a left-rear face (not shown) and exits through the right-front face 814.

In the description of FIG. 9, the parts will be described in reference to the optical fiber crossing region 726 initially, with the alternative part descriptions that reference the optical fiber crossing region 728 following in parentheses where applicable. In the disposition of the optical fiber crossing region 726 (728) depicted in FIG. 9, the second (first) optical Kerr media element 718 (716) intersects with the uptake optical fiber 216F (optical fiber V 118S) but not with the uptake optical fiber 214F (optical fiber H 116S). As described earlier, the second (first) probe photons arrive at the optical fiber crossing region 726 (728) in coincidence with the signal photon components passing through the first modified focused intersection optical apparatus 712 (second modified focused intersection optical apparatus 714). The phases of the second (first) probe photons are altered when they pass through the optical fiber crossing region 726 (728) in coincidence with a signal photon component passing through the uptake optical fiber 216F (optical fiber V 118S). The disposition of the interrelated protocols embodiment 710 is not limited to the arrangement wherein the first optical Kerr media element 716 intersects with the optical fiber V 118S and the second optical Kerr media element 718 intersects with the uptake optical fiber 216F. Included among the additional dispositions (not shown) of the interrelated protocols embodiment 710 are:

1. Only one of the optical Kerr media elements 716 or 718 intersecting optical fibers of either the first or second modified focused intersection optical apparatuses 712 or 714;
2. Either or both of the first or second optical Kerr media elements 716 and 718, respectively, intersecting a different optical fiber that crosses the respective optical fiber crossing regions 728 and 726 than is intersected by the first or second optical Kerr media elements 716 or 718, respectively, in FIGS. 7 and 9; and
3. Either or both of the first or second optical Kerr media elements 716 and 718, respectively, intersecting both of the optical fibers that cross the respective optical fiber crossing regions 728 or 726. The particular arrangement of intersections of optical Kerr media elements and optical fibers that comprises the disposition of the interrelated protocols embodiment 710 depicted in FIGS. 7–9 is for illustrative purposes only, and is not limiting of the variety of arrangements available to the interrelated protocols embodiment 710.

In addition to the various physical dispositions described immediately above, the interrelated protocols embodiment 710 can also employ differing means of responding to probe photons' changes in phase. Included among the functional capacities of the differing responding means are abilities to respond to an alteration of the probe photons' phase but not to the amount of alteration in phase, as well as abilities to respond to the amount of the alteration in phase also. Different means of responding to potential alterations of the probe photons' phase can be employed for each optical Kerr media element, and the linking agent 730 can be utilized to enable the optical Kerr media elements' various responding means to be conducted either separately or jointly.

Protocol Network Functional Capabilities

For the interrelated protocols embodiment 710, the signal photons traversing the first or second modified focused intersection optical apparatuses 712 or 714, respectively, can generally be classified as belonging to one of three sets of initial circumstances. In a first set of initial circumstances, neither of the signal photons are in the superposition of linearly polarized states; in a second set of initial circumstances, only one signal photon is in the superposition of linearly polarized states; and in a third set of initial circumstances, both signal photons are in superpositions of states. For the first set of initial circumstances, both the first and second probe photons undergo phase alterations when traversing the regions of intersection 128F and 128S, respectively, since neither signal photon exhibits destructive interference when traversing the interference zones 130F and 130S.

The interrelated protocols embodiment 710 can evince the protocol networks' extended functional capabilities when the signal photons are in either the second or third set of initial circumstances. A representative description of the interrelated protocols embodiment's 710 evincing of the protocol networks' extended functional capabilities when the signal photons are in the third set of initial circumstances will also generally describe the evincing of these capabilities when the photons are in the second set of initial circumstances. The description for the third set of initial circumstances can also serve for the second set of initial circumstances because the second set of initial circumstances can be considered a subset of the third set of initial circumstances. This subset of the third set of initial circumstances arises when the superposition of linearly polarized states of one of the signal photons is demolished, such as by the operation of the selectable photon counter 122F (not shown in FIG. 7), but the superposition of linearly polarized states of the other signal photon is not.

The following descriptions of the protocol networks' extended functional capabilities will generally involve, for a particular functional capability, a description of the first modified focused intersection optical apparatus 712 behaving differently from the second modified focused intersection optical apparatus 714. An important note is that the following protocol networks' extended functional capabilities are largely also achievable if the first modified focused intersection optical apparatus 712 and the second modified focused intersection optical apparatus 714 components are interchanged in a given description. This interchanging of components is an inherent aspect of these descriptions, and the scope of the present invention is not limited by any portion of the description that does not also explicitly detail the interchanging of components. Additionally, an auxiliary interrelated protocols embodiment (not shown) can include a second linking agent 730 (not shown) that can also interrelate the optical Kerr media element 716 with the optical Kerr media element 718, and is disposed between the opposite ends of the Kerr media elements from where the linking agent 730 is disposed. For this auxiliary interrelated protocols embodiment, the Kerr media elements are also capable of containing auxiliary probe photons moving in the positive y-direction, i.e. opposite to arrows 722 and 724. For this auxiliary interrelated protocols embodiment, the potential range of functional capabilities are then symmetric with regards to the first modified focused intersection optical apparatus 712 and the second modified focused intersection optical apparatus 714. The auxiliary interrelated protocols embodiment may also include a pair of optical Kerr media elements 716 (not shown) and/or a pair of optical Kerr media elements 718 (not shown), wherein each of said pair of optical Kerr media elements 716 and/or optical Kerr media elements 718 intersect with a different one of the optical fibers that cross the relevant optical fiber crossing region 728 and/or 726, respectively. The auxiliary interrelated protocols embodiment may also utilize the linking agent 730 to interconnect responses to alterations in phase of the respective probe photons of one or more of these additional Kerr media elements. The auxiliary interrelated protocols embodiment may further include multiple linking agents 730 (not shown) which can selectively interconnect responses to alterations in phase of the probe photons of the various optical Kerr media elements 716 and/or 718. Interconnections afforded by multiple linking agents 730 can comprise various permutations of the auxiliary interrelated protocols embodiment's elements, as well as partially and/or completely repeating combinations of interconnection permutations.

Inter-Protocol Effects

The interrelated protocols embodiment 710 provides a multiplicity of inter-protocol effects that enable differing means of realizing a variety of the protocol networks' extended functional capabilities. These inter-protocol effects are able to function both individually and in varied combinations for realizing the protocol networks' capabilities. The inter-protocol effects may be directly realized; potentially realized (such as by a delayed-choice execution); or latently realized, such as when the inter-protocol effects' consequence(s) depend on other factors which may be unknown, undetermined, or yet to occur.

The multiplicity of types of inter-protocol effects include, but are not limited to:

1. A first type of inter-protocol effect generally involving the presence or absence of the first signal photons' superpositions of states being among the determining factors of the presence or absence of the second signal photons' superpositions of states. The first type of inter-protocol effect can involve responding to whether or not the probe photons passing through the optical Kerr media element 716 underwent a phase alteration upon crossing the first and second modified focused intersection optical apparatuses 712 and 714, respectively. In such an instance of the first type of inter-protocol effect, the presence or absence of the superposition of linearly polarized states in the signal photons of the first modified focused intersection optical apparatus 712 (first signal photons) can determine whether or not the superposition of linearly polarized states of the signal photons in the second modified focused intersection optical apparatus 714 (second signal photons) are demolished. Only the existence of a phase alteration of the probe photons, but not the magnitude of the phase alteration, is responded to. Consequently, when the first signal photons are not in superpositions of states, the probe photons' phases alter when crossing the interference zone 130F, and no information is available regarding whether or not the phase of the probe photon was further altered when crossing the optical fiber crossing region 728. Because there is no information available about the probe photons' possible phase alteration when crossing the optical fiber crossing region 728, there is also no information available about which optical fiber the second signal photon was in when crossing the optical fiber crossing region 728, and the superposition of linearly polarized states of the second signal photons are not thereby demolished. When the first signal photons are in superpositions of states, the probe photons' phases are not altered when crossing the interference zone 130F. Hence the response to whether or not the probe photons' phases were altered upon crossing the optical fiber crossing region 728 can reveal which optical fiber the second signal photons were in when crossing the optical fiber crossing region 728. Thus, the second signal photons' superpositions of states are demolished when the first signal photons' superpositions of states are present, and are not demolished when the first signal photons' superpositions of states are absent. Consequently, in this instance of the first type of inter-protocol effect, controlling whether or not the first signal photons' superpositions of states are demolished (such as by selectively utilizing the photon counters 122 or 124) can control whether or not the second signal photons' superpositions of states are preserved. The first type of inter-protocol effect can also be conducted in a delayed-choice manner wherein, for example, the demolishing of the first signal photons' superpositions of states can be effected after the first signal photons have already crossed the first modified focused intersection optical apparatus 712, or even after all the signal and probe photons have entirely finished traversing the interrelated protocols embodiment 710.

2. A second type of inter-protocol effect generally involving the presence or absence of access to knowledge of the presence or absence of the first signal photons' superpositions of states being among the determining factors of the presence or absence of the second signal photons' superpositions of states. The second type of inter-protocol effect can involve responding to the first or second probe photons' degree of phase alteration after the probe photons have crossed the first and second modified focused intersection optical apparatuses 712 and 714, respectively. In such an instance of the second type of inter-protocol effect, responding to the cumulative degree of the first or second probe photons' phase alterations enables responsiveness to the number of signal photons which have traversed the respective optical Kerr media elements at the same time as the probe photons. When it is known that the first signal photon is in the superposition of linearly polarized states, responding to the degree of the first probe photons' phase alterations after traversing the first and second modified focused intersection optical apparatuses 712 and 714, respectively, also provides the capability of responding to whether or not the second signal photon passed through optical fiber V 118S. Regardless of the response outcome, just the capability, in principle, of knowing whether or not the second signal photons passed through optical fiber V 118S demolishes the second signal photons' superpositions of states. However, when it is not definitively known that the first signal photon is in the superposition of linearly polarized states, then responding to the degree of change in phase of the probe photons does not necessarily provide responsiveness to whether or not the second signal photons passed through the optical fiber V 118S, and hence will not necessarily demolish the second signal photon's superposition of linearly polarized states. This second type of inter-protocol effect can also be conducted in a delayed-choice manner wherein, for example, access to knowledge of the first signal photon's superposition of linearly polarized states can be gained after the first signal photons have already crossed the first modified focused intersection optical apparatus 712, or even after all the signal and probe photons have entirely finished traversing the interrelated protocols embodiment 710.

3. A third type of inter-protocol effect generally involving various combinations of the presence or absence of the first and second signal photons' superpositions of states and/or the presence or absence of access to knowledge thereof being determining factors of the presence or absence of the superpositions of states of either or both signal photons. The third type of inter-protocol effect can involve responding to differences between the first and second probe photons' phase alterations following traversal of their respective optical Kerr media elements, as well as responding to combinations of the phase alterations of the first and second probe photons. Analogously to the instances of the first or second types of inter-protocol effects described above, instances of the third type of inter-protocol effect can involve responding to only whether or not the probe photons phase was altered, but not the degree of phase alteration; or can involve also responding to the degree of the probe photons' phase alterations; or can involve differing combinations thereof. Among other occurrences, various specific instances of the third type of inter-protocol effect can also involve differing permutations of the occurrence of, or controlling the occurrence of, at least some of:
  a) The presence or absence of either or both signal photons' superpositions of linearly polarized states;
  b) The presence or absence of access to knowledge of either or both signal photons' superpositions of linearly polarized states;
  c) The presence or absence of a difference between the first and second signal photons' respective superposition of linearly polarized states statuses; and
  d) The presence or absence of access to knowledge of a difference between the first and second signal photons' respective superposition of linearly polarized states statuses. Various instances of the third type of inter-protocol effect can often involve utilizing one or more optional linking agents 730. This third type of inter-protocol effect can also be conducted in a delayed-choice manner similarly to the first and second types of inter-protocol effects.

Additional inter-protocol effects are producible by employing optical Kerr media elements which intersect with optical fibers of both the first modified focused intersection optical apparatus 712 and the second modified focused intersection optical apparatus 714. Still further inter-protocol effects are producible by employing interferometers, such as the Mach-Zender type, constructed from optical Kerr media element branches. If the optical Kerr media element 716 or 718 is a portion of a Mach-Zender interferometer, this interferometer can provide a sensitive means of responding to any alteration in the phase of the probe photons.

Yet more types of inter-protocol effects, and various instances thereof, can be realized by utilizing alternative arrangements of the elements that comprise the above described types of inter-protocol effects. Besides the physical configuration of the protocol network utilized and the particular procedure with which the inter-protocol effect is conducted, input factors influencing various inter-protocol effects can include the signal photons' superpositions of states, the probe photons' phases, and access to knowledge of these superpositions of states and phases. The outputs of various inter-protocol effects can include the presence or absence of any of the signal photons superpositions of states, whether or not the phase of any of the probe photons was altered and/or the degree of said phase alteration, access to knowledge of the various inter-protocol effect outputs, and variations in the certainty of this knowledge or the certainty of the access to this knowledge. The inter-protocol effects can also incorporate delayed-choice effects to further increase the range of available inter-protocol effect capabilities.

The avenues available for utilizing inter-protocol effects are further multiplied by generalizing the physical arrangement depicted in the interrelated protocols embodiment 710. As noted previously, the interrelated protocols embodiment 710 is a representation of one particular realization of a protocol network, and is not limiting of the diversity of realizations encompassed within the scope of the present invention. These realizations may also include additional modified focused intersection optical apparatuses, as well as additional optical Kerr media elements interconnecting assorted portions of varying numbers of the constituent modified focused intersection optical apparatuses. Additionally, the diversity of realizations may also include additional linking agents 730 which can interconnect varying numbers of the optical Kerr media elements in assorted combinations. These realizations are also not limited to interconnections in essentially two dimensions, such as the arrangement of the interrelated protocols embodiment 710 depicted in FIG. 7. This primarily two-dimensional arrangement is shown only for purposes of clarity of illustration. Various alternative interrelated protocols embodiments can also be disposed in diverse three dimensional arrangements that can thereby provide concomitant extensions of the range of avenues available for utilizing the inter-protocol effects. In addition, the available avenues proliferate still further when the previously described entanglement properties are utilized in conjunction with any portion of a protocol network according to the present invention.

In view of the above, it will be seen that the various objects and features of the invention are achieved and other advantageous results obtained. The examples contained herein are merely illustrative and are not intended in a limiting sense.

What is claimed is:

1. A superposition of states responding system capable of responding to an entity's potential quantum superposition of states comprising:
  a state distinguisher that is capable of distinguishing between first and second states that are components of the entity's potential superposition of states;
  a state conditioner that is capable of putting the first and second distinguished states in condition to be capable of interfering with each other;
  an interference actuator that produces self-interference by the entity, when the entity is in a superposition of states, by enacting interference between the conditioned first and second distinguished states; and
  an interference responder that is capable of being responsive to said entity's self-interference.

2. The superposition of states responding system of claim 1 wherein said state distinguisher is further able to distinguish a first subset of the component states of the entity's potential superposition of states from a second subset of the component states of the entity's potential superposition of states, said first and second subsets differing from each other and each containing at least one component state of the entity's potential superposition of states; and said state conditioner is further capable of putting the first and second distinguished subsets in condition to be capable of interfering with each other; and said interference actuator is further capable of producing self-interference by the entity, when the entity is in a superposition of states, by enacting interference between the conditioned first and second subsets.

3. The superposition of states responding system of claim 1 wherein said state distinguisher is further capable of enabling the superposition of states responding system to be capable of acting upon the first distinguished state differently than how the superposition of states responding system acts upon the second distinguished state.

4. The superposition of states responding system of claim 2 wherein said state distinguisher is further capable of enabling the superposition of states responding system to be capable of acting upon the first distinguished subset differently than how the superposition of states responding system acts upon the second distinguished subset.

5. The superposition of states responding system of claim 1 wherein at least one of said first and second states are eigenstates of an observable of the entity.

6. The superposition of states responding system of claim 2, wherein at least one of said component states contained within the first and second subsets is an eigenstate of an observable of the entity.

7. The superposition of states responding system of claim 1, wherein said state conditioner is capable of a state altering operation that can alter at least one of said first and second states so that said first and second states are capable of revealing effects of interference with each other.

8. The superposition of states responding system of claim 7, wherein said effects of interference includes a capability of revealing effects of destructive interference.

9. The superposition of states responding system of claim 1, wherein said state conditioner is capable of a phase aligning operation that can selectively influence the phase of at least one of said first and second states.

10. The superposition of states responding system of claim 1, wherein said state distinguisher distinguishes between said first and second states by producing a spatial separation between them.

11. The superposition of states responding system of claim 1, wherein said state distinguisher distinguishes between said first and second states by producing a spatial separation between them, and said state conditioner is capable of a phase aligning operation that can selectively influence the phase of at least one of said first and second states, and said interference actuator is capable of enacting the entity's self-interference by selectively recombining the separated and phase aligned first and second states.

12. The superposition of states responding system of claim 1, wherein said interference actuator is capable of producing the entity's self-interference in a manner such that spatial information relating to where the potential self-interference could occur enables the superposition of states responding system to respond to said entity's self-interference.

13. The superposition of states responding system of claim 1, wherein said interference actuator is capable of producing the entity's self-interference in a manner such that temporal information relating to when the potential self-interference could occur enables the superposition of states responding system to respond to said entity's self-interference.

14. The superposition of states responding system of claim 1, wherein said interference responder is capable of responding to at least one of a range of manifestations of interference, said range of manifestations of interference including both positive manifestations that are direct evidence of the entity's self-interference, and negative manifestations that indirectly indicate the entity's self-interference by the lack of evidence that would otherwise be present if the entity did not self-interfere.

15. The superposition of states responding system of claim 14, wherein said positive manifestations can involve evidence that would be not available in the same manner were the entity to not self-interfere, and wherein said negative manifestations can involve evidence that is lacking due to the entity's destructive self-interference.

16. The superposition of states responding system of claim 1, wherein said superposition of states responding system is also capable of preserving the entity's superposition of states throughout at least a portion of the superposition of states responding system's interaction with the entity, and wherein said superposition of states preserving portion of the entity's interaction with the superposition of states responding system can involve the entirety of said entity's interaction with the superposition of states responding system.

17. The superposition of states responding system of claim 16, wherein said superposition of states responding system has both superposition of states preserving and superposition of states demolishing capabilities when responding to the entity's superposition of states.

18. The superposition of states responding system of claim 17, wherein said superposition of states responding system can be switched between the superposition of states preserving and demolishing capabilities.

19. The superposition of states responding system of claim 18, wherein said switching between the superposition of states preserving and demolishing capabilities can be selectively effected.

20. The superposition of states responding system of claim 19, wherein said selective switching can be effected in a delayed-choice manner.

21. The superposition of states responding system of claim 1, wherein said superposition of states responding system is capable of confirming whether the entity is in a superposition of states.

22. The superposition of states responding system of claim 1, wherein said superposition of states responding system is capable of discerning said entity that is in a superposition of states from said entity that is not in an superposition of states.

23. The superposition of states responding system of claim 1, wherein said superposition of states responding system is capable of both discerning said entity that is in a superposition of states from said entity that is not and of confirming whether said entity is in a superposition of states.

24. The superposition of states responding system of claim 23, wherein said confirming and discerning capabilities can be effected jointly and alternatively, and wherein at least one of said confirming, discerning, and jointly discerning and confirming capabilities can be selectively effected.

25. The superposition of states responding system of claim 22, wherein said superposition of states responding system is further capable of preserving the entity's superposition of states throughout at least a portion of the superposition of states responding system's interaction with the entity, and wherein said superposition of states preserving portion of the entity's interaction with the superposition of states responding system can involve the entirety of said entity's interaction with the superposition of states responding system.

26. The superposition of states responding system of claim 25, wherein said superposition of states responding system has superposition of states preserving and superposition of states demolishing capabilities.

27. The superposition of states responding system of claim 26, wherein said superposition of states responding system can be switched between the superposition of states preserving and demolishing capabilities.

28. The superposition of states responding system of claim 27, wherein said switching between the superposition of states preserving and demolishing capabilities can be selectively effected.

29. The superposition of states responding system of claim 28, wherein said selective switching between the superposition of states preserving and demolishing capabilities can be effected in a delayed-choice manner.

30. The superposition of states responding system of claim 24, wherein at least one of said confirming, discerning, and jointly discerning and confirming capabilities can be selectively effected in a delayed-choice manner.

31. The superposition of states responding system of claim 1, when interacting with a first entity that is entangled with at least a second entity that shares the superposition of states with said first entity, is further capable of responding to said second entity's superposition of states.

32. The superposition of states responding system of claim 1, when interacting with a first entity that is entangled with at least a second entity that shares said first entity's superposition of states, is further capable of responding to said second entity's entanglement.

33. The superposition of states responding system of claim 31, when interacting with the first entity that is entangled with at least the second entity that shares the superposition of states with said first entity, is further capable of responding to said second entity's superposition of states without directly interacting with said second entity, and without interacting with any effects from any interaction with said second entity.

34. The superposition of states responding system of claim 32, when interacting with the first entity that is entangled with at least the second entity that shares the superposition of states with said first entity, is further capable of responding to said second entity's entanglement without directly interacting with said second entity, and without interacting with any effects from any extraneous interaction with said second entity.

35. The superposition of states responding system of claim 31, when interacting with the first entity that is entangled with at least the second entity that shares the superposition of states with said first entity, is also capable of preserving the second entity's superposition of states throughout at least a portion of the superposition of states responding system's interaction with the first entity, and wherein said second entity superposition of states preserving portion of the first entity's interaction with the superposition of states responding system can involve the entirety of said first entity's interaction with the superposition of states responding system.

36. The superposition of states responding system of claim 35, wherein said superposition of states responding system has both second entity superposition of states preserving and second entity superposition of states demolishing capabilities.

37. The superposition of states responding system of claim 36, wherein said superposition of states responding system can be switched between second entity superposition of states preserving and second entity superposition of states demolishing capabilities.

38. The superposition of states responding system of claim 37, wherein said switching between the second entity superposition of states preserving and second entity superposition of states demolishing capabilities can be selectively effected.

39. The superposition of states responding system of claim 37, wherein said switching between the second entity superposition of states preserving and second entity superposition of states demolishing capabilities can be effected in a delayed-choice manner.

40. The superposition of states responding system of claim 31, wherein said superposition of states responding system is capable of confirming whether the second entity is in a superposition of states.

41. The superposition of states responding system of claim 31, wherein said superposition of states responding system is capable of discerning said second entity that is in a superposition of states from said second entity that is not in an superposition of states.

42. The superposition of states responding system of claim 31, wherein said superposition of states responding system is capable of both discerning said second entity that is in a superposition of states from said second entity that is not and of confirming whether said second entity is in a superposition of states.

43. The superposition of states responding system of claim 42, wherein said confirming and discerning capabilities can be effected both jointly and alternatively, and wherein at least one of said confirming, discerning, and jointly discerning and confirming capabilities are capable of being selectively effected.

44. The superposition of states responding system of claim 1, wherein said entity is selected from a group consisting of elementary particles, bosons, fermions, atoms, molecules, Bose-Einstein condensates, virtual particles, and composites of the members of this group.

45. The superposition of states responding system of claim 1, wherein any of said state distinguisher, said state conditioner, said interference actuator, and said interference responder can effect their respective operations by utilizing electromagnetic phenomena.

46. A method of providing the capability of responding to an entity's potential quantum superposition of states comprising the steps of:
   providing the capability of distinguishing between first and second states that are components of the entity's potential superposition of states;
   providing the capability of putting said first and second distinguished states in condition to be capable of interfering with each other;
   providing the capability of producing self-interference by the entity, when the entity is in a superposition of states, by enacting interference between said conditioned first and second distinguished states; and
   providing the capability of responding to manifestations of said entity's self-interference.

47. The method of providing the capability of responding to an entity's potential quantum superposition of states according to claim 46, wherein said capability of distinguishing between first and second states is further capable of distinguishing a first subset of the component states of the entity's potential superposition of states from a second subset of the component states of the entity's potential superposition of states, said first and second subsets differing from each other and each containing at least one component state of the entity's potential superposition of states; and said capability of conditioning said first and second states is further capable of putting the first and second distinguished subsets in condition to be capable of interfering with each other; and, when the entity is in a superposition of states, said capability of producing self-interference by the entity is further capable of enacting interference between the conditioned first and second subsets.

48. The method of providing the capability of responding to an entity's potential quantum superposition of states according to claim 46, wherein said capability of distinguishing between first and second states provides the further capability of acting upon the first distinguished state differently than how the second distinguished state is acted upon.

49. The method of providing the capability of responding to an entity's potential quantum superposition of states according to claim 47, wherein said capability of distinguishing between first and second subsets provides the further capability of acting upon the first distinguished subset differently than how the second distinguished subset is acted upon.

50. The method of providing the capability of responding to an entity's potential quantum superposition of states according to claim 46, wherein at least one of said first and second states are eigenstates of an observable of the entity.

51. The method of providing the capability of responding to an entity's potential quantum superposition of states according to claim 47, wherein at least one of said component states contained within the first and second subsets is an eigenstate of an observable of the entity.

52. The method of providing the capability of responding to an entity's potential quantum superposition of states according to claim 46, wherein said capability of conditioning is further capable of altering at least one of said first and second states so that said first and second states are capable of revealing effects of interference with each other.

53. The method of providing the capability of responding to an entity's potential quantum superposition of states according to claim 52, wherein said effects of interference includes a capability of revealing effects of destructive interference.

54. The method of providing the capability of responding to an entity's potential quantum superposition of states according to claim 46, wherein said capability of conditioning is further capable of selectively influencing the phase of at least one of said first and second states.

55. The method of providing the capability of responding to an entity's potential quantum superposition of states according to claim 46, wherein said capability of distinguishing between said first and second states involves producing a spatial separation between them.

56. The method of providing the capability of responding to an entity's potential quantum superposition of states according to claim 46, wherein said capability of distinguishing between said first and second states involves producing a spatial separation between them, and said capability of conditioning is further capable of selectively influencing the phase of at least one of said first and second states, and said capability of producing self-interference by the entity is further capable of enacting the entity's self-interference by selectively recombining the separated and phase aligned first and second states.

57. The method of providing the capability of responding to an entity's potential quantum superposition of states of states according to claim 46, wherein said capability of producing self-interference by the entity involves utilizing spatial information relating to where the potential self-interference could occur in the providing of the capability of responding to manifestations of said entity's self-interference.

58. The method of providing the capability of responding to an entity's potential quantum superposition of states of states according to claim 46, wherein said capability of producing self-interference by the entity involves utilizing temporal information relating to when the potential self-interference could occur in the providing of the capability of responding to manifestations of said entity's self-interference.

59. The method of providing the capability of responding to an entity's potential quantum superposition of states according to claim 46, wherein said capability of responding to manifestations of said entity's self-interference involves capabilities of responding to at least one of a range of manifestations of interference, said range of manifestations of interference including both positive manifestations that are direct evidence of the entity's self-interference, and negative manifestations that indirectly indicate the entity's self-interference by a lack of evidence that would otherwise be present if the entity did not self-interfere.

60. The method of providing the capability of responding to an entity's potential quantum superposition of states according to claim 59, wherein said positive manifestations can involve evidence that would not be available in the same manner were the entity to not self-interfere, and wherein said negative manifestations can involve evidence that is lacking due to the entity's destructive self-interference.

61. The method of providing the capability of responding to an entity's potential quantum superposition of states according to claim 46, wherein said method also provides a capability of preserving the entity's superposition of states throughout at least a portion of the method's interaction with the entity, and wherein said superposition of states preserving portion of the method's interaction with the entity can involve the entirety of said entity's interaction with the method.

62. The method of providing the capability of responding to an entity's potential quantum superposition of states according to claim 61, wherein said method is capable of providing both superposition of states preserving and superposition of states demolishing capabilities when responding to the entity's superposition of states.

63. The method of providing the capability of responding to an entity's potential quantum superposition of states according to claim 62, wherein said method is further capable of switching between superposition of states preserving and demolishing capabilities.

64. The method of providing the capability of responding to an entity's potential quantum superposition of states according to claim 63, wherein said switching between the superposition of states preserving and demolishing capabilities can be selectively effected.

65. The method of providing the capability of responding to an entity's potential quantum superposition of states according to claim 64, wherein said selective switching can be effected in a delayed-choice manner.

66. The method of providing the capability of responding to an entity's potential quantum superposition of states according to claim 46, wherein said method provides the further capability of confirming whether the entity is in a superposition of states.

67. The method of providing the capability of responding to an entity's potential quantum superposition of states according to claim 46, wherein said method provides the further capability of discerning said entity that is in a superposition of states from said entity that is not in a superposition of states.

68. The method of providing the capability of responding to an entity's potential quantum superposition of states according to claim 46, wherein said method provides the further capability of both discerning said entity that is in a superposition of states from said entity that is not and of confirming whether said entity is in a superposition of states.

69. The method of providing the capability of responding to an entity's potential quantum superposition of states according to claim 68, wherein said confirming and discerning capabilities are capable of being effected jointly and alternatively, and wherein at least one of said confirming, discerning, and jointly discerning and confirming capabilities can be selectively effected.

70. The method of providing the capability of responding to an entity's potential quantum superposition of states according to claim 67, wherein said method provides the further capability of preserving the entity's superposition of states throughout at least a portion of the method's interaction with the entity, and wherein said superposition of states preserving portion of the entity's interaction with the method can involve the entirety of said entity's interaction with the method.

71. The method of providing the capability of responding to an entity's potential quantum superposition of states according to claim 70, wherein said method provides superposition of states preserving and superposition of states demolishing capabilities.

72. The method of providing the capability of responding to an entity's potential quantum superposition of states according to claim 71, wherein said method provides the further capability of switching between the superposition of states preserving and demolishing capabilities.

73. The method of providing the capability of responding to an entity's potential quantum superposition of states according to claim 72, wherein said switching between the superposition of states preserving and demolishing capabilities can be selectively effected.

74. The method of providing the capability of responding to an entity's potential quantum superposition of states according to claim 73, wherein said selective switching between the superposition of states preserving and demolishing capabilities can be effected in a delayed-choice manner.

75. The method of providing the capability of responding to an entity's potential quantum superposition of states according to claim 69, wherein at least one of said confirming, discerning, and jointly discerning and confirming capabilities can be selectively effected in a delayed-choice manner.

76. The method of providing the capability of responding to an entity's potential quantum superposition of states according to claim 46, when interacting with a first entity that is entangled with at least a second entity that shares the superposition of states with said first entity, provides the further capability of responding to said second entity's superposition of states.

77. The method of providing the capability of responding to an entity's potential quantum superposition of states according to claim 46, when interacting with a first entity that is entangled with at least a second entity that shares the superposition of states with said first entity, provides the further capability of responding to said second entity's entanglement.

78. The method of providing the capability of responding to an entity's potential quantum superposition of states according to claim 76, when interacting with the first entity that is entangled with at least the second entity that shares the superposition of states with said first entity, provides the further capability of responding to said second entity's superposition of states without directly interacting with said second entity, and without interacting with any effects from any extraneous interaction with said second entity.

79. The method of providing the capability of responding to an entity's potential quantum superposition of states according to claim 77, when interacting with the first entity that is entangled with at least the second entity that shares the superposition of states with said first entity, provides the further capability of responding to said second entity's entanglement without directly interacting with said second entity, and without interacting with any effects from any extraneous interaction with said second entity.

80. The method of providing the capability of responding to an entity's potential quantum superposition of states according to claim 76, when interacting with the first entity that is entangled with at least the second entity that shares the superposition of states with said first entity, provides the further capability of preserving the second entity's superposition of states throughout at least a portion of the method's interaction with the first entity, and wherein said second entity superposition of states preserving portion of the first entity's interaction with the method can involve the entirety of said first entity's interaction with the method.

81. The method of providing the capability of responding to an entity's potential quantum superposition of states according to claim 80, wherein said method provides the further capabilities of preserving and demolishing the second entity's superposition of states.

82. The method of providing the capability of responding to an entity's potential quantum superposition of states according to claim 81, wherein said method provides the further capability of switching between preserving and demolishing the second entity's superposition of states.

83. The method of providing the capability of responding to an entity's potential quantum superposition of states according to claim 82, wherein said method provides the further capability of selectively effecting said switching between preserving and demolishing the second entity's superposition of states.

84. The method of providing the capability of responding to an entity's potential quantum superposition of states according to claim 82, wherein said capability of switching between the second entity superposition of states preserving and second entity superposition of states demolishing capabilities can be effected in a delayed-choice manner.

85. The method of providing the capability of responding to an entity's potential quantum superposition of states according to claim 76, wherein said method provides the further capability of confirming whether the second entity is in a superposition of states.

86. The superposition of states responding system of claim 76, wherein said method provides the further capability of discerning said second entity that is in a superposition of states from said second entity that is not in an superposition of states.

87. The method of providing the capability of responding to an entity's potential quantum superposition of states according to claim 76, wherein said method provides the further capabilities of both discerning said second entity that is in a superposition of states from said second entity that is not and of confirming whether said second entity is in a superposition of states.

88. The method of providing the capability of responding to an entity's potential quantum superposition of states according to claim 87, wherein said method's confirming and discerning capabilities can be effected jointly and alternatively, and wherein at least one of said confirming, discerning, and jointly discerning and confirming capabilities are capable of being selectively effected.

89. The method of providing the capability of responding to an entity's potential quantum superposition of states according to claim 46, wherein said entity is selected from a group consisting of elementary particles, fermions, bosons, atoms, molecules, Bose-Einstein condensates, virtual particles, and composites of the members of this group.

90. The method of providing the capability of responding to an entity's potential quantum superposition of states according to claim 46, wherein any of said capabilities of state distinguishing, state conditioning, interference producing, and responding to manifestations of self-interference can be effected by utilizing electromagnetic phenomena.

91. An apparatus capable of responding to an entity's potential quantum superposition of states comprising:
  a preparatory conditioner that, when the entity is in a quantum superposition of states, puts said entity in condition to be capable of self-interference;
  an interference actuator that manifests said entity's self-interference, when the entity is in a quantum superposition of states and has been put in condition for self-interference by said preparatory conditioner; and
  an interference responder that is capable of being responsive to manifestations of said entity's self-interference.

92. The apparatus capable of responding to an entity's potential quantum superposition of states according to claim 91, wherein said preparatory conditioner provides a capability of effecting an eigenstate distinguishing operation that is capable of distinguishing between eigenstates of an observable that are components of the entity's superposition of states.

93. The apparatus capable of responding to an entity's potential quantum superposition of states according to claim 91, wherein said preparatory conditioner provides a capability of effecting at least one separate action on at least one eigenstate that is a component of the entity's superposition of states, said separate action differing from at least one of the actions that are effected by the apparatus on at least one other eigenstate that is a component of the entity's superposition of states.

94. The apparatus capable of responding to an entity's potential quantum superposition of states according to claim 91, wherein said preparatory conditioner provides a capability of effecting an eigenstate altering operation on at least one of the eigenstates that are components of the entity's superposition of states so that at least two of the component eigenstates are then capable of interfering with each other.

95. The apparatus capable of responding to an entity's potential quantum superposition of states according to claim 91, wherein said preparatory conditioner provides a capability of effecting a phase aligning operation that can influence the phase of at least one of the eigenstates that are components of the entity's superposition of states.

96. The apparatus capable of responding to an entity's potential quantum superposition of states according to claim 91, wherein said interference actuator provides a capability of effecting an interfering operation that can, when the entity has been put into condition to be capable of self-interference by the preparatory conditioner, bring about self-interference by the entity, the possible types of said self-interference including varying degrees of destructive self-interference which can be of sufficient degree so as to become complete destructive self-interference.

97. The apparatus capable of responding to an entity's potential quantum superposition of states according to claim 96, wherein said varying degrees of destructive interference can be selectively effected, and said selective effecting of the varying degrees of destructive interference can be brought about in a controllable manner.

98. The apparatus capable of responding to an entity's potential quantum superposition of states according to claim 91, wherein said interference responder's capability of being responsive to manifestations of the entity's self-interference can involve various capabilities of responding to at least one of a variety of manifestations of the entity's self-interference, said variety of manifestations of interference including both positive manifestations that are direct evidence of the entity's self-interference, and negative manifestations that indirectly indicate the entity's self-interference by a lack of evidence that would otherwise be present if the entity did not self-interfere.

99. The apparatus capable of responding to an entity's potential quantum superposition of states according to claim 98, wherein said positive manifestations can involve evidence that would not be available in the same manner were the entity to not self-interfere, and wherein said negative manifestations can involve evidence that is lacking due to the entity's destructive self-interference.

100. The apparatus capable of responding to an entity's potential quantum superposition of states according to claim 91, wherein said interference responder provides a capability of effecting a conditional response to the entity's potential superposition of states, said conditional response being capable of differentiating in accordance with differentiation in the manifestations of the entity's self-interference, said differentiation in the conditional response including a capability of effecting a lack of response when the entity manifests destructive self-interference.

101. The apparatus capable of responding to an entity's potential quantum superposition of states according to claim 100, wherein said conditional response differentiation can include at least one of confirming said manifestations of self-interference, confirming the lack of said manifestations of self-interference, discerning between various manifestations of self-interference, and combinations thereof.

102. The apparatus capable of responding to an entity's potential quantum superposition of states according to claim 101, wherein at least one of said preparatory conditioner, said interference actuator, and said interference responder can operate in a delayed-choice manner.

103. The apparatus capable of responding to an entity's potential quantum superposition of states according to claim 91, wherein at least one of said preparatory conditioner, said interference actuator, and said interference responder can operate in a manner that preserves the entity's superposition of states throughout at least a portion of the apparatus' interaction with the entity, and wherein the entity superposition of states preserving portion of the entity's interaction with the apparatus can involve the entirety of the entity's interaction with the apparatus.

104. The apparatus capable of responding to an entity's potential quantum superposition of states according to claim 103, wherein the entity superposition of states preserving operation of at least one of said preparatory conditioner, said interference actuator, and said interference responder is capable of being selectively effected; and said selective effecting of said superposition of states preserving operation of said preparatory conditioner, said interference actuator, and said interference responder is capable of being brought about in a controllable manner; and said selective effecting of said superposition of states preserving operation of said preparatory conditioner, said interference actuator, and said interference responder is capable of being effected in a delayed choice manner.

105. The apparatus capable of responding to an entity's potential quantum superposition of states according to claim 91, wherein said entity is selected from a group consisting of elementary particles including fermions and bosons, atoms, molecules, Bose-Einstein condensates, virtual particles, and composites of the members of this group.

106. The apparatus capable of responding to an entity's potential quantum superposition of states according to claim 105, wherein said entity is a photon and said apparatus is capable of utilizing at least one of optical fibers, crystals including birefringent crystals, reflecting surfaces including perfect and imperfect mirrors, optical Kerr media, masking agents including screens, photo detectors, charge coupled devices, scattering elements, wave plates including quarter and half wave plates, photon counters, scintillation devices, devices employing the optical Kerr effect, and devices employing the Casimir effect in the operations of at least one of the preparatory conditioner, interference actuator, and interference responder.

107. The apparatus capable of responding to an entity's potential quantum superposition of states according to claim 105, wherein said entity is capable of possessing at least one of an electric charge, a magnetic moment, and a magnetic spin; and said apparatus is capable of utilizing electromagnetic phenomena in the operations of at least one of the preparatory conditioner, interference actuator, and interference responder.

108. A method of conditionally responding to an entity's potential quantum superposition of states comprising the steps of:
　　conditioning an entity that is potentially in a quantum superposition of states, wherein said conditioning enables the entity, when the entity is in a superposition of states, to be capable of self-interference;
　　realizing the entity's potential self-interference, when the entity is in a superposition of states and has been put in condition for self-interference by said conditioning; and
　　responding to manifestations of the entity's potential self-interference.

* * * * *